(12) United States Patent
Dockus et al.

(10) Patent No.: US 6,913,184 B2
(45) Date of Patent: Jul. 5, 2005

(54) ALLOY COMPOSITION AND METHOD FOR LOW TEMPERATURE FLUXLESS BRAZING

(75) Inventors: Kostas F. Dockus, Cicero, IL (US);
Brian E. Cheadle, Bramalea (CA);
Robert H. Krueger, Spring Grove, IL (US); Feng Liang, Oakville (CA);
Mark S. Kozdras, Fergus (CA)

(73) Assignee: Dana Canada Corporation, Oakville (CA)

( * ) Notice: Subject to any disclaimer, the term of this patent is extended or adjusted under 35 U.S.C. 154(b) by 0 days.

(21) Appl. No.: 10/300,837

(22) Filed: Nov. 21, 2002

(65) Prior Publication Data

US 2003/0189082 A1 Oct. 9, 2003

Related U.S. Application Data

(63) Continuation-in-part of application No. 09/990,567, filed on Nov. 21, 2001.

(51) Int. Cl.$^7$ .......................... B23K 35/14; B32B 15/10
(52) U.S. Cl. ................. 228/56.3; 228/246; 228/262.51; 428/652; 428/654
(58) Field of Search ................................ 228/245, 246, 228/254, 262.51; 148/518, 528; 428/648, 652, 654

(56) References Cited

U.S. PATENT DOCUMENTS

| | | | |
|---|---|---|---|
| 1,627,900 A | 5/1927 | Hewitson | |
| 2,142,564 A | 1/1939 | Korpium | |
| 2,745,799 A | 5/1956 | Patrie | |

(Continued)

FOREIGN PATENT DOCUMENTS

| | | |
|---|---|---|
| EP | 587307 B1 | 12/1996 |
| EP | 0605323 B1 | 5/2000 |
| EP | 0595601 B2 | 7/2001 |
| FR | 2617868 | 1/1989 |
| GB | 1087054 | 9/1964 |
| GB | 2270086 | 3/1984 |
| WO | WO0071784 | 11/2000 |
| WO | WO0168312 | 9/2001 |
| WO | WO0188226 | 11/2001 |
| WO | WO0207928 | 1/2002 |
| WO | WO0238321 | 5/2002 |
| WO | WO0238326 | 5/2002 |

OTHER PUBLICATIONS

Aluminum Standards and Data 1984, pp. 1–2; 7; 15–21; 29–30.
Aluminum Standards and Data 1997, The Aluminum Association, 1996, pp. 6–1—6–6.
Designation: B 253 –73, Standard Recommended Practice for Preparation of and Electroplating on Aluminum Alloys by the Zincate Process, 1974, pp. 72–81.
Designation: B 253–87 (Reapproved 1993), Standard Guide for Preparation of Aluminum Alloys for Electroplating, pp. 48–54.

(Continued)

Primary Examiner—Lynne R. Edmondson
(74) Attorney, Agent, or Firm—Howrey Simon Arnold & White, LLP

(57) ABSTRACT

A family of low temperature brazing alloys wherein the alloy is utilized in the form of a filler metal or shim and consists of electroplated nickel on zinc shimstock, wherein the zinc shimstock includes zinc, aluminum and silicon, with or without a small amount of lead, tantalum or bismuth. The use of the brazing alloys for joining aluminum parts together or an aluminum part to a part of another metal, such as brass. Further, metallic coating could be thermally spray coated and powder metals could be utilized as the filler materials with equally acceptable brazing techniques. Using these techniques, the brazing could be accomplished at a temperature in the range of 750 to 1050° F.

73 Claims, 2 Drawing Sheets

U.S. PATENT DOCUMENTS

| | | | |
|---|---|---|---|
| 2,821,014 A * | 1/1958 | Miller | 428/654 |
| 3,321,828 A | 5/1967 | Miller | |
| 3,332,517 A | 7/1967 | Voser | |
| 3,338,725 A | 8/1967 | Banks | |
| 3,417,005 A | 12/1968 | Baig | |
| 3,482,305 A | 12/1969 | Dockus | |
| 3,553,825 A | 1/1971 | Dockus | |
| 3,597,658 A | 8/1971 | Rivera | |
| 3,675,310 A | 7/1972 | Schwaneke et al. | |
| 3,703,763 A | 11/1972 | Berry | |
| 3,843,333 A | 10/1974 | Woods | |
| 3,970,237 A | 7/1976 | Dockus | |
| 4,028,200 A | 6/1977 | Dockus | |
| 4,164,454 A | 8/1979 | Schober | |
| 4,388,159 A | 6/1983 | Dockus et al. | |
| 4,448,853 A * | 5/1984 | Fischer et al. | 428/607 |
| 4,451,541 A * | 5/1984 | Beal | 428/658 |
| 4,489,140 A | 12/1984 | Pulliam | |
| 4,785,092 A | 11/1988 | Namba et al. | |
| 4,826,736 A * | 5/1989 | Nakamura et al. | 428/613 |
| 4,890,784 A | 1/1990 | Bampton | |
| 4,901,908 A | 2/1990 | Negura et al. | |
| 5,028,495 A * | 7/1991 | Hirano et al. | 428/622 |
| 5,044,546 A | 9/1991 | De Clerck | |
| 5,069,980 A | 12/1991 | Namba et al. | |
| 5,072,789 A | 12/1991 | Usui et al. | |
| 5,100,048 A | 3/1992 | Timsit | |
| 5,232,788 A | 8/1993 | Timsit et al. | |
| 5,316,206 A | 5/1994 | Syslak | |
| 5,422,191 A | 6/1995 | Childree | |
| 5,464,146 A | 11/1995 | Zaluzec et al. | |
| 5,466,360 A | 11/1995 | Ehrsam et al. | |
| 5,894,054 A | 4/1999 | Paruchuri et al. | |
| 6,129,262 A | 10/2000 | Cooper et al. | |
| 6,379,818 B1 | 4/2002 | Mooij et al. | |
| 6,383,661 B2 | 5/2002 | Wittebrood et al. | |
| 6,391,476 B2 * | 5/2002 | Wittebrood et al. | 428/654 |
| 6,503,640 B2 | 1/2003 | Wittebrood et al. | |
| 6,568,584 B2 | 5/2003 | Wittebrood et al. | |
| 6,596,413 B2 * | 7/2003 | Wittebrood et al. | 428/652 |
| 6,599,645 B2 | 7/2003 | Wittebrood | |
| 6,605,370 B2 * | 8/2003 | Wittebrood et al. | 428/652 |
| 6,796,484 B2 * | 9/2004 | Wittebrood et al. | 228/249 |
| 2001/0040180 A1 | 11/2001 | Wittebrood et al. | |
| 2002/0012811 A1 | 1/2002 | Wittebrood et al. | |
| 2002/0037425 A1 * | 3/2002 | Mooij et al. | 428/652 |
| 2002/0050511 A1 | 5/2002 | Wittebrood et al. | |
| 2002/0086179 A1 * | 7/2002 | Wittebrood | 428/652 |
| 2002/0088717 A1 | 7/2002 | Wittebrood et al. | |
| 2002/0139685 A1 | 10/2002 | Schmitter | |
| 2002/0175205 A1 | 11/2002 | Wittebrood et al. | |
| 2003/0042146 A1 | 3/2003 | Wijenberg et al. | |
| 2003/0064242 A1 | 4/2003 | Wittebrood et al. | |
| 2003/0091856 A1 * | 5/2003 | Wittebrood | 428/654 |
| 2003/0155409 A1 * | 8/2003 | Dockus et al. | 228/245 |
| 2003/0189082 A1 | 10/2003 | Dockus | |
| 2003/0197050 A1 * | 10/2003 | Graham et al. | 228/123.1 |

OTHER PUBLICATIONS

Durney, Electroplating Engineering Handbook, Fourth Edition, 1984, pp. 185–188; 245; 247–250.

Engström et al., A Multilayer Clad Aluminum Material with Improved Brazing Properties, 1988, pp. 222–226.

Finstock and Brazing Products for Heat Exchanger Applications, Alcan.

Golby et al., A study of the Effect of Pretreatment Procedures on the Plating of Aluminium Alloys, Surface Technology, 12, (1981) 141–155.

Golby et al., Factors Influencing the Growth of Zinc Immersion Deposits on Aluminum Alloys, Transactions of the Institute of Metal Finishing, 1981, vol. 59, pp. 17–24.

Lentz et al., Aluminum Brazing Handbook, Third Edition, 1979, pp. 5–6; 8; 24–33; 36; 58–61; 65–66.

Metal Progress, Mid–June DATABOOK 1980, Properties and Applications of Wrought Aluminum Alloys, pp. 56–57.

Metals & Alloys in the Unified Numbering System, Seventh Edition, 1996, pp. 31–35; 42; 44.

Pearson et al., Improvements in the Pretreatment of Aluminum as a Substrate for Electrodeposition, Trans IMF, 1997, 75(3), pp. 93–97.

Such et al., An Improvement in Zincate Method for Plating on Aluminum, 1965, pp. 1027–1034.

The Coil which Goes Around the World Technical Data.

Van Horn, Aluminum, vol. I. Properties, Physical Metallurgy and Phase Diagrams, 1987, pp. v; 48–55; 162–165; 178–179; 192–209; 300–303.

Wernick et al., The Surface Treatment and Finishing of Aluminium and its Alloys, Fifth Edition, vol. 1, 1987, pp. iii–v; xxx–xxxi;180–183; 190–203.

Wernick et al., The Surface Treatment and Finishing of Aluminum and its Alloys, Fifth Edition, vol. 2, 1987, pp. 1023–1083.

Wyszynski, An Immersion Alloy Pretreatment for Electroplating on Aluminium, Transactions of the Institute of Metal Finishing, 1967, vol. 45, pp. 147–154.

Wyszynski, Electrodeposition on Aluminium Alloys, Transactions of the Institute of Metal Finishing, 1980, vol. 58, pp. 34–40.

Research Disclosure 439070, anonymous disclosure, Kenneth Mason Publications Ltd, published Nov. 2000, pp. 1946–1947.

Preparation of and Electroplating on Aluminum Alloys by Zincate Process—American National Standard Institute, Aug. 19, 1974.

B.E. Cheadle and K.F. Dockus, International Congress and Exposition , Detroit, Michigan, Feb. 29–Mar. 4, 1988; SAE Technical Paper Series—Inert Atmosphere Fluxless Brazing of Aluminum Heat Exchangers.

* cited by examiner

ALLOY COMPOSITION AND METHOD FOR LOW TEMPERATURE FLUXLESS BRAZING

CROSS REFERENCE TO RELATED APPLICATION

This is a continuation-in-part of U.S. patent application Ser. No. 09/990,507, filed Nov. 21, 2001, now pending, incorporated herein by reference.

FIELD OF THE INVENTION

The invention disclosed herein relates to a methods of fluxless brazing of aluminum at low temperature (about 730–1130° F. or 388–610° C.), and to a family of brazing alloy compositions with suitably low melting temperature ranges. In particular, the present invention relates to methods and compositions which are particularly suited for use in the brazing of two or more aluminum parts together or in the joining of dissimilar metals or combinations thereof, using aluminum or zinc based filler metals.

BACKGROUND OF THE INVENTION

Aluminum brazing is usually accomplished by heating with a torch or other localized heat source, by salt-dip brazing, or in a furnace. Furnace brazing can be performed in air using active flux salts such as zinc chloride, however preferred furnace brazing processes use protective atmospheres such as vacuum, or inert gas, in combination with either fluxless braze promoters, or non-corrosive fluxes. Sometimes furnace brazing is used to assemble one set of components, and then additional components are brazed afterwards, using a secondary brazing operation that may use a localized heating method to avoid damage to the first brazed assembly. To braze aluminum, filler metals are normally used in the form of either (1) wire or shim stock, (2) a paste of flux and filler metal powder or as (3) a clad layer on brazing sheet composite.

Processes for brazing usually provide at least one mating surface having a specific bonding material, placing the mating surfaces in contact, and then applying a particular heating procedure to bring the assembly to a temperature range suitable to accomplish melting of the filler metals, and upon cooling, joining of the assembled components. Either a flux or a braze promoter is provided, typically in the filler metal, or applied to the filler metal surface, to permit disruption of surface oxides, and wetting of the members to be joined by the filler metal.

Various methods of bonding aluminum are known in the prior art. In the case of complex assemblies such as heat exchangers, where multiple, thin wall aluminum components are required to be sealingly joined with multiple braze bonds, furnace brazing processes have been most widely used. Because of the difficulty of post-braze removal of corrosive fluxes or salts, two general categories of furnace brazing have been most widely commercialized, ie, fluxless vacuum brazing (VB), and controlled atmosphere brazing (CAB) flux brazing.

In vacuum brazing, the parts to be brazed are provided with sufficient quantities of magnesium, normally as Mg alloy constituents in the filler metal or in the aluminum components, such that, when brought to temperature in a brazing furnace under sufficient vacuum conditions, the magnesium becomes sufficiently volatile to disrupt the oxide layer present and permit the underlying aluminum filler metal to flow together. While this technique provides for good bonding, it is essentially a discontinuous process, resultant from the need to apply a vacuum, and thus, is relatively expensive. It is also difficult to control, as it is very sensitive to oxidizing conditions in the furnace atmosphere, and demands that onerous standards of material cleanliness be maintained. Further, the evaporation of the magnesium leads to condensation in the brazing furnace, which requires frequent removal, thereby further adding to costs. For heat exchanger applications, it is sometimes desirable to add small amounts of zinc to the aluminum materials being brazed, to improve corrosion resistance. A limitation of VB however, is that the zinc constituents are, like Mg, relatively volatile, so that control of the as-brazed zinc composition in the aluminum structure being brazed, is difficult.

In controlled atmosphere brazing (CAB), the ability to braze does not result from mechanical disruption of the oxide but rather, from chemical modification of the oxide by a fluoride salt flux which is applied to the parts. An example of the type of flux used for CAB brazing is NOCOLOK™ flux. As the name suggests, CAB brazing does not require that a vacuum be drawn, such that the process may readily be carried out on a continuous basis, most typically using an inert gas furnace. While this provides for some reduction in cost, this cost saving is partially offset by the necessity for integration of flux application systems, many of which will suffer from variable flux loading. Moreover, after the flux has been applied, the flux can be susceptible to flaking, such that braze quality is affected, or contamination of the article of manufacture can occur. The flux can also be difficult to apply, especially on internal joints; and can cause problems in terms of furnace corrosion and cleanliness in the finished product. More importantly however, it has been found that the flux can lose activity when exposed to magnesium. Thus, this process is not suitable for brazing magnesium-enriched aluminum alloys. As magnesium is a commonly used alloying element in aluminum to improve, inter alia, strength, this reduces the attractiveness of CAB brazing.

Applications for brazing aluminum are not limited to heat exchangers, however heat exchangers require relatively complex assemblies of stacked plates or tubular members that require reliable, low cost joining of multiple joints. Some heat exchangers, for example oil coolers and air conditioning evaporators, require extensive internal joints that must be brazed, in concert with internal passageways that do not provide a source for particulate flux residues in the functional lubrication or refrigerant system. Recently, stacked assemblies of brazed metal plates are being considered as possible methods of assembly of fuel cell engines. Because of their structural similarity to plate-type heat exchangers, heat exchanger brazing technology is of significant interest. The joining of fuel cell plates requires reliable laminar type bonds (extended lap joints). However, fuel cell plates tend to be thin and have intricately formed, narrow flow field channels that are easily clogged by flux or by excess filler metal flow. Using prior art CAB processes, it has been difficult to satisfactorily braze fuel cell plates without internal flux contamination, and therefore CAB is unattractive, and the cost of vacuum brazing is prohibitive. As a consequence, fluxless brazing methods are of increased recent interest, for both heat exchanger and fuel cell engine applications.

A number of brazing processes disclosed in the prior art disclose utilize filler metal compositions based on aluminum, zinc and silicon. For example, U.S. Pat. No. 5,464,146 discloses the deposition of a thin film of aluminum eutectic forming material (Si, Al—Si or Al—Zn), by electron beam physical vapor deposition or conventional sputtering on at least one of the shapes to be brazed or joined. The assembly is then heated to a temperature between 1075 and 1105° F. in the presence of a suitable fluxing agent, to diffuse eutectic forming material into the aluminum and form a braze joint.

U.S. Pat. No. 5,072,789, describes an aluminum heat exchanger with an aluminum fin and tube joined primarily by a fillet of zinc prepared using a zinc chloride slurry or zinc wire sprayed coating, again in the presence of a suitable flux. U.S. Pat. No. 4,901,908 describes a process of forming a zinc or zinc-aluminum alloy on an aluminum surface by a spraying technique, which alloy has a melting point lower than that of the core. In U.S. Pat. No. 4,890,784, diffusion bonding of aluminum alloys is performed using a thin alloy interlayer of magnesium, copper or zinc placed between mating surfaces of the alloy members to be bonded.

U.S. Pat. No. 4,785,092 discloses an aluminum clad brazing material consisting of 4.5 to 13.5% Si, 0.005 to less than 0.1% Sr, and additionally one element from the group consisting of 0.3 to 3.0% magnesium, 2.3 to 4.7% copper, and 9.3 to 10.7% zinc with the balance being aluminum. This alloy is useful for brazing in vacuum or inert atmospheres from 1040 to 1112° F.

U.S. Pat. No. 3,703,763 describes forming a zinc bonding material using molten zinc to bond foamed aluminum with sheet aluminum.

In U.S. Pat. No. 5,422,191, an aluminum brazing alloy is described which can be used in either vacuum brazing or CAB brazing processes. The brazing alloy is clad with an aluminum alloy containing about 0.01 to 0.30% by weight lithium and 4 to 18% by weight silicon.

U.S. Pat. Nos. 5,232,788, and 5,100,048, describe an aluminum brazing method using silicon metal powder with a brazing flux such as potassium fluoroaluminate. The preferred metal component of the coating mixture is silicon, but other metals such as zinc, copper or nickel may be used.

A process for joining aluminum is described in U.S. Pat. No. 5,044,546 for putting zinc on aluminum using a zinc immersion bath followed by cadmium plating and then heating in a vacuum to form a braze joint.

Another vacuum brazing process is found in U.S. Pat. No. 5,069,980 using two clad alloys comprising silicon and a small amount of magnesium. Other elements in the cladding may be at least one of the following from a group consisting of Pb, Sn, Ni, Cu, Zn, Be, Li, and Ge.

Another method of joining aluminum members is described in U.S. Pat. No. 5,316,206 where aluminum is coated with zinc or a 5% aluminum-zinc alloy by dipping into the molten alloy bath. Following preassembly and applying a flux material, the aluminum members were heated to an elevated temperature in a furnace to form braze joints.

In a prior art method of fluxless aluminum brazing, the aluminum parts being joined required plating with a braze-promoting layer typically comprising nickel and/or cobalt. The braze-promoting layer was applied by a variety of methods, including plating in alkaline plating media, conventional electroless deposition from a hypophosphite solution. Alternatively, U.S. Pat. Nos. 3,970,237, 4,028,200, 3,553,825 and 3,482,305 describe plating baths for electroless and electrolytic plating of braze-promoting metals such as nickel, nickel-lead, cobalt, cobalt-lead or cobalt-nickel-lead onto aluminum alloy surfaces.

Presently there are several known fluxless brazing methods, as described in U.S. Pat. Nos. 3,332,517, 3,321, 828 and many of the patents discussed above, which can be applied to brazing of aluminum alloys having a liquidus temperature somewhat above that of the presently available commercial Al—Si based filler metals (ie sufficiently above 1070 to 1175° F.). Unfortunately, many aluminum casting alloys including die castings, and some high strength heat treatable (2xxx or 7xxx) alloys have a liquidus and solidus temperature range below or very similar to those of the commercial brazing alloys, and therefore are not suitable for the present brazing processes. Also, as discussed, some of the prior art brazing methods are sensitive to Mg concentrations above threshold amounts, which may limit their applicability to brazing 5xxx or some 6xxx aluminum materials.

Therefore, there is a continued need for brazing processes and brazing products which are useful for brazing at low temperature in the absence of a flux.

SUMMARY OF THE INVENTION

In one aspect, the present invention provides a brazing product for low temperature, fluxless brazing, comprising: (a) a temperature modifier layer comprised of at least 50% of a metal selected from the group comprising zinc, aluminum and copper; and (b) a braze promoting layer comprising one or more metals selected from the group comprising nickel and cobalt; wherein, during brazing, the temperature modifier layer and the braze-promoting layer form a filler metal having a liquidus temperature in the range from about 730 to 1130° F.

In another aspect, the present invention provides a brazing product for low temperature, fluxless brazing, comprising: (a) a temperature modifier layer comprised of at least 50% of a metal selected from the group comprising zinc, aluminum and copper; and (b) a braze promoting layer comprising one or more metals selected from the group comprising nickel, cobalt and iron; wherein, during brazing, the temperature modifier layer and the braze-promoting layer and perhaps the substrate interact to form a filler.

BRIEF DESCRIPTION OF THE DRAWINGS

The invention is now described, by way of example only, with reference to the accompanying drawings, in which.

DETAILED DESCRIPTION OF PREFERRED EMBODIMENTS

Figure 1:
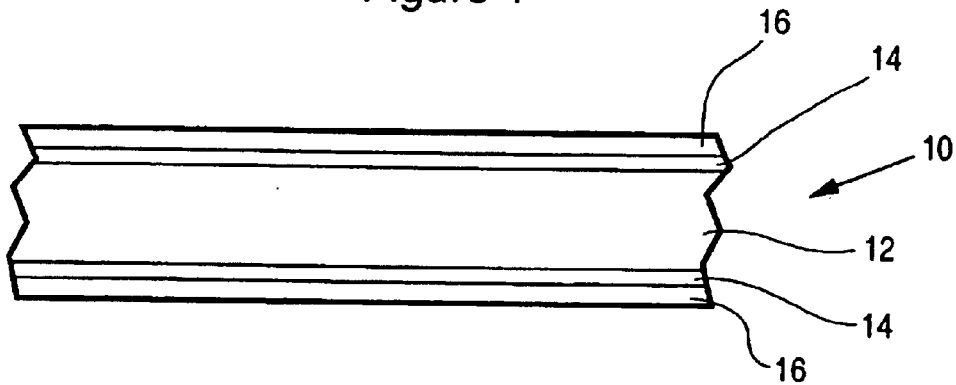
FIG. 1 is a schematic illustration of a preferred brazing preform according to the invention.

The present invention provides new methods for fluxless brazing at low temperature, and a family of brazing products for use with this method having filler metal compositions with lowered melting temperatures, which products exhibit improved wetting and brazing characteristics when joining components comprised of similar or dissimilar metals.

Brazing at lower temperature than conventional brazing processes provides a number of advantages. For example, lower temperature brazing can be used to enable improved secondary brazing processes, including secondary furnace brazing, which may be used to increase brazed product design flexibility. Reduced braze temperatures can be further exploited to reduce gauge thickness of component parts, especially aluminum parts, since the degree of thermal diffusion and erosion of the component substrate by the liquid filler metal will be decreased. Lower temperatures will provide easier control of the brazing process and make the brazing process more versatile and more economical. Further, the addition of self-fluxing alloying metals such as nickel and lead or bismuth, to a filler metal composition braze promoting layer improves the filler metal wetting and spreading properties, thus permitting brazing under less demanding inert atmosphere or vacuum conditions. Successful fluxless brazing has been obtained in all brazing tests without fail, with the temperature range of the new filler metals about 250° F. lower than the generally accepted flow temperatures of commercial aluminum-silicon alloys and, as such, is a significant improvement in aluminum brazing technology.

The novel brazing products according to the invention comprise brazing alloys which form a filler metal during brazing, the filler metal having a liquidus temperature in the range of about 730 to 1130° F. (388 to 610° C.), more preferably 750 to 1050° C. (400 to 570° C.), typically from about 790 to 1050° F. (420 to 570° C.). Preferably the brazing products according to the invention include one or more temperature modification layers, at least one of which is an aluminum-based layer (at least 50 weight percent aluminum), a zinc-based layer (at least 50 weight percent zinc), or a copper-based layer (at least 50 weight percent copper). The temperature modifier layer optionally combines with other layers in the brazing alloy to form a filler metal having a liquidus temperature in the range of about 730 to 1130° F. Preferably, the filler metal comprises one or more of zinc, aluminum, copper, silicon, magnesium, antimony and nickel in amounts such that the filler metal has a liquidus temperature in the range of about 730 to 1130° F. Even more preferably, the filler metal comprises zinc, zinc-nickel, zinc-antimony, zinc-aluminum, aluminum-zinc, aluminum-zinc-silicon, aluminum-silicon-magnesium, aluminum-zinc-silicon-magnesium, aluminum-silicon-zinc-copper, or aluminum-silicon-copper-magnesium having a liquidus temperature in the range of about 730 to 1130° F.

In combination with the temperature modifier layer, there may preferably be applied one or more additional layers selected from braze-promoting layers, bonding layers, barrier layers, and additional temperature modifier layers. The locations and compositions of these additional layers will be described in detail below.

The brazing products according to the invention exhibit excellent wetting and brazing characteristics without the need for a flux, when joining two or more components comprised of similar or dissimilar metals. For example, the brazing products according to the invention may be used to join components comprising aluminum to other aluminum-based components or to components comprised of dissimilar metals. For example, the invention permits fluxless brazing of aluminum castings, including die castings, and aluminum alloys which are not readily brazeable by conventional means, such as 2xxx, 5xxx, 6xxx or 7xxx-series alloys. Certain aluminum alloys, notably 2xxx, 6xxx and 7xxx-series alloys brazed according to this invention can be heat treated after brazing, to increase strength. The present invention also permits fluxless brazing aluminum (previously considered to be unbrazeable); copper and copper alloy substrates; and, with suitable coatings, dissimilar metal combination, including those disclosed in the applicants' co-pending U.S. application Ser. No. 10/300,836 field Nov. 21, 2002 and entitled "Improvements in Fluxless Brazing".

The brazing method according to the invention is suitable for continuous, inert gas furnace brazing, or for secondary-operation brazing using a protective shielding gas and any suitable heating source, and can be used to produce a range of industrial products, including aluminum heat exchangers or similar stacked assemblies such as metallic plates for fuel cell engines. It is anticipated that this brazing method and layered filler metal compositions, can also be used as wire or preform filler metals for shielded arc welding or brazing.

The brazing products according to the invention are exemplified by the following structures:

Braze Preform

FIG. 1 comprises a schematic diagram illustrating the layers making up a preferred structure of a brazing preform 10 according to the invention. Preform 10 comprises a central temperature modifier layer 12, optional bonding layers 14 on both sides of the temperature modifier 12, and braze-promoting layers 16 on top of the bonding layers 14. The preform 10 is preferably in the form of a sheet, foil, shim, wire or rod which is interposed between two similar or dissimilar metal components to form an assembly. When the assembly is heated to a temperature in the range from about 730 to 1130° F. for a sufficient period of time, the entire preform melts to form a filler metal which brazes the components together. Thus, the preform 10 is consumed during the brazing process. Although less preferred, it is possible to apply the bonding layer 14 and braze-promoting layer 16 to only one side of the temperature modifier 12.

The temperature modifier layer 12 is either zinc-based, aluminum-based or copper-based and has a liquidus temperature of about 730 to 1130° F. Most preferably, the temperature modifier layer is comprised of zinc; zinc and nickel; zinc and antimony; alumimun and zinc; aluminum and silicon; zinc and silicon; aluminum, silicon and magnesium, or aluminum, zinc, silicon and magnesium, in relative amounts such that the temperature modifier layer having a liquidus temperature in the range of about 730 to 1130° F. Most preferably, the temperature modifier layer 12 of preform 10 comprises zinc, zinc-nickel, zinc-aluminum, aluminum-zinc, aluminum-zinc-silicon, aluminum-silicon-magnesium, or aluminum-zinc-silicon-magnesium having a liquidus temperature in the range of about 730 to 1130° F.

The temperature modifier layer may also include an optional melt depressant such as magnesium or copper and may also include an optional braze modifier selected from bismuth, lead, antimony, thallium, lithium and strontium.

It is to be understood that a bonding layer 14 is optional and is preferably applied where the temperature modifier layer 12 is aluminum-based and/or where it is desired to electroplate a nickel-based braze-promoting layer 16 under acidic conditions. Where the temperature modifier layer is zinc-based, a bonding layer is typically not required. This being said, the bonding layer preferably has a composition as described in the applicants' co-pending application Ser. No. 10/300,836, incorporated herein by reference in its entirety, and preferably comprises one or more metals selected from the group comprising zinc, tin, lead, bismuth, nickel, antimony, magnesium, lithium and thallium. For example, the bonding layer may preferably be comprised of pure or substantially pure zinc, tin, lead or bismuth, or may be primarily zinc, tin, lead or bismuth (e.g. at least 50 weight %). Minor amounts of these or other elements may be present, as discussed in more detail below. Typically, such elements are present at less than 10%, more usually less than 5% by weight, and possibly less than 1%.

In some preferred embodiments, the bonding layer is comprised primarily of zinc or tin in combination with one or more braze modifier elements selected from the group comprising bismuth, lead, lithium and antimony. The total amount of the braze modifers may be up to 50%, but preferably is less than 25%, e.g. in the range 1 to 25%. As a practical matter, even impurity levels of braze modifiers such as lead and bismuth can be sufficient to have positive effects on brazing, but the amounts of these elements are preferably controlled in continuous processes such that they are no longer considered impurities.

In some preferred embodiments of the invention, the bonding layer comprises a very thin zincate or stannate pretreatment; thin electroless nickel, bismuth, lead, nickel-lead or nickel-bismuth pretreatment; or a combination of zincate/stannate bonding layer with a copper plated, or sequential copper/nickel plated barrier coating, as preconditioning steps for subsequent fast zinc electroplating. This preconditioning permits the use of acid zinc plating baths, which have practical and environmental advantages over traditional cyanide alkaline copper baths.

The thickness of the bonding layer is preferably up to about 0.5 microns, more preferably up to about 0.3 microns, and most preferably in the range of 0.01 to 0.15 microns or 0.02 to 0.15 microns, with 0.03 microns being an example of a particularly preferred thickness. The bonding layer may be applied to the substrate by immersion plating, with or without mechanical abrasion, using the plating bath compositions described in the applicants' co-pending application Ser. No. 10/300,836. Furthermore, it will be appreciated that the application of a bonding layer to the substrate is merely one of a number of "pretreatments" which can be used to promote adhesion of the braze-promoting layer and the underlying substrate, and that it may be possible to replace the bonding layer by, or use it in combination with, any of the alternate pretreatments disclosed in the applicants' co-pending application Ser. No. 10/300,836.

Suitable braze-promoting layers 16 for use in preform 10 include those described in the applicants' co-pending application Ser. No. 10/300,836. For example, the braze-promoting layer preferably comprises one or more metals selected from the group comprising nickel, cobalt and iron. More preferably, the braze-promoting layer is nickel-based, and may preferably comprise pure nickel or nickel in combination with one or more alloying elements and/or impurities selected from the group comprising cobalt, iron, lead, bismuth, magnesium, lithium, antimony and thallium. Preferred braze modifiers include bismuth, lead, antimony and thallium. Specific examples of nickel-based braze-promoting layers are nickel, nickel-bismuth, nickel-lead, nickel-cobalt, nickel-bismuth-cobalt, nickel-lead-cobalt, nickel-lead-bismuth, nickel-bismuth-antimony, etc.

In some preferred embodiments of a nickel-based braze-promoting layer, lead or bismuth is present in an amount of up to about 10%, preferably up to about 5%, and more preferably up to about 3%, although lower amounts and even trace amounts of these elements may also have a beneficial effect. For example, amounts of lead or bismuth as low as up to about 1.0%, about 0.01 to 1.0%, or about 0.01 to 0.05% may be beneficial.

The braze-promoting layer may be applied by electroplating, electroless plating, roll bonding, thermal spraying, plasma spraying, chemical vapor deposition (CVD), physical vapor deposition (PVD) or other techniques for depositing metal or metal alloys from a gas or vapour phase, although some of these methods would be impractical or difficult to control. Electroplating using the conditions and plating baths disclosed in the applicants' co-pending application Ser. No. 10/300,836 is the most preferred method for applying the braze-promoting layer 16 to preform 10.

For aluminum alloy material systems, the thickness of the braze-promoting layer is preferably up to about 2.0 microns, more preferably up to about 1.0 microns, and even more preferably up to about 0.5 microns, and most preferably about 0.05 to 0.5 microns. A preferred minimum thickness of the braze-promoting layer is about 0.25 to 0.30 microns. For alternate filler metal systems, notably zinc or copper-based systems, increased maximum thickness levels for the braze promoter layers may be tolerable.

The preform 10 may preferably include an additional temperature modifier layer (not shown), preferably a copper-based layer applied between the bonding layer 14 and the braze-promoting layer 16.

Figure 2:
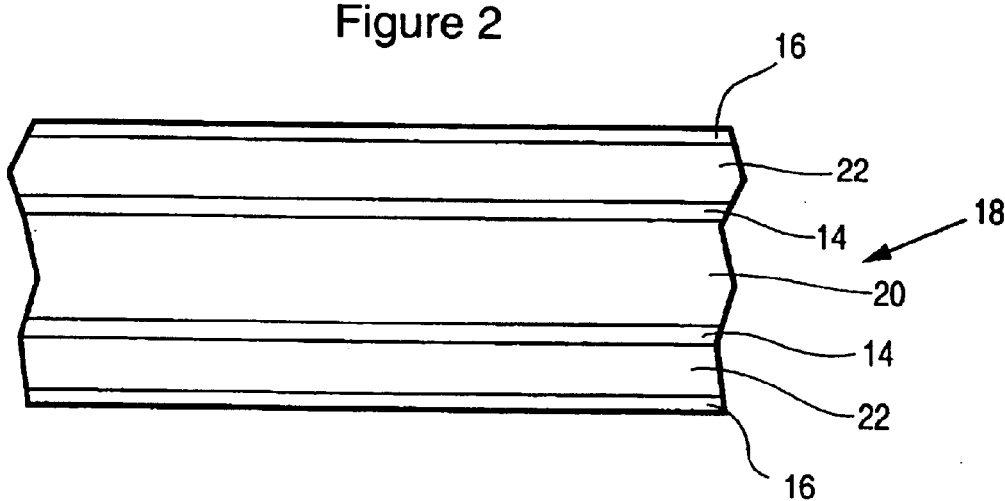
FIG. 2 is a schematic illustration of a preferred brazing sheet according to the invention in which a temperature modifier layer is applied by hot dipping, arc spraying, thermal spraying, low temperature kinetic energy metallization or HVLP (high velocity low pressure) coating methods.

Brazing Sheet with Temperature Modifier Layer Applied by Hot Dipping, Arc Spraying, Thermal Spraying, Low Temperature Kinetic Energy Metallization or HVLP (High Velocity Low Pressure) Coating Methods A preferred structure of this type of brazing sheet 18 is schematically illustrated in FIG. 2, and comprises a central core layer 20, optional bonding layers 14 on both sides of the core 20, temperature modifier layers 22 on top of the bonding layers, and braze-promoting layers 16 on top of the temperature modifier layers 22. The brazing sheet is preferably incorporated into an assembly, either in the form of a sheet or a shaped object, and is brazed to one or more other components in the assembly, the other components either comprising similar or dissimilar metals. When the assembly is heated to a temperature in the range from about 730 to 1130° F. for a sufficient period of time, the bonding layers 14, temperature modifier layer 22 and the braze-promoting layers 16 melt and are incorporated into the filler metal which brazes the components together. Although less preferred, it is possible to apply a bonding layer 14, temperature modifier layer 22 and braze-promoting layer 16 to only one side of the core layer 20.

The bonding layers 14 and braze-promoting layers 16 preferably have the compositions described above. Furthermore, it is to be understood that the bonding layers 14 are optional and the most preferred bonding layers 14 are those described above which are zinc-based or nickel-based. The temperature modifier layer may preferably have a composition as described above in the context of temperature modifier layer 12 of preform 10.

The core layer has a melting point high enough that it does not melt during the brazing operation, and is preferably formed from aluminum or an aluminum alloy. In some preferred embodiments the core sheet also comprises magnesium to increase amongst others the strength of the core layer. The core may preferably contain magnesium in a range of up to about 8%, more preferably in a range of up to about 5.0%, and even more preferably up to about 2.0%. The amount of magnesium in the alloy is highly variable, depending on the intended application of the brazing product, and may be at or below 0.05% for AA3003 alloy.

Further alloying elements may be added to the core such as, but not limited to, Cu, Zn, Bi, V, Fe, Ag, Si, Ni, Co, Pb, Ti, Zr and Mn in suitable ranges.

Preferred aluminum alloys for use in the core layer include conventional aluminum alloys employed in brazing such as AA3xxx-series alloys. Alternatively, the core materials may instead comprise other, less conventional, alloys such as AA2xxx, AA5xxx, AA6xxx, AA7xxx and AA8xxx-series alloys, due to the fact that the present invention permits brazing at relatively low temperatures; and that diffusion migration of potentially deleterious elements from these higher alloyed core materials into the braze filler metal system, can be mitigated by a combination of lower braze temperatures, and the use of suitable barrier layers, or interlayers.

Rather than being formed from aluminum or an aluminum alloy, the core may instead comprise titanium, titanium alloys, copper, bronze or brass or other copper alloys, high strength steel, low carbon steel, stainless steel, nickel or nickel alloy steel, or coated versions of these, and including the materials specifically disclosed in the applicants' co-pending application Ser. No. 10/300,836.

For typical heat exchanger applications, the core sheet has a thickness typically in a range of at most 5 mm, more preferably in the ranges of 0.1 to 2.5 mm, 0.1 to 2.0 mm or 0.2 to 2 mm.

Preferably, the brazing sheet according to this embodiment also comprises a thin, transient barrier coating (not shown) applied at the interface between the core layer 20 and the bonding layer 14, or at the interface between the core layer 20 and the temperature modifier layer 22 where the bonding layer 14 is not present. It is believed that the barrier coating acts to temporarily restrict diffusion of the low melting filler material (comprising layers 16, 22 and optionally 14) into the core layer 20 during brazing, to avoid loss of eutectic-forming elements and to increase the efficacy and efficiency of the applied filler metal coating.

The barrier coating may preferably be the same as that of preform 10, or may be comprised of nickel, nickel-lead or nickel-bismuth and is applied to the core layer 20 or the bonding layer 14 prior to coating with the low-melting temperature modifier. Barrier coatings comprising copper, copper-lead or copper-bismuth may also be preferred in some embodiments, either in addition to, or in substitution for, the nickel-based barrier coating. The barrier coating can preferably be applied by electroless or electrolytic plating.

Brazing Sheet with Roll Bonded Cladding

Figure 3:
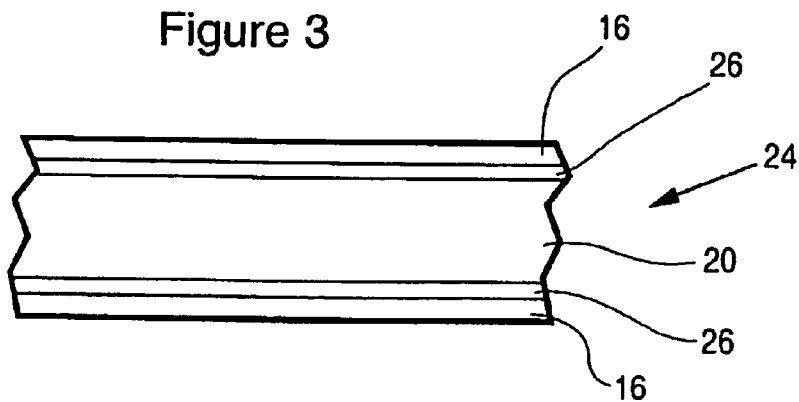
FIG. 3 is a schematic illustration of a preferred brazing sheet according to the invention in which a temperature modifier layer is applied by roll bonding.

FIG. 3 illustrates a preferred structure of a brazing sheet 24 having a roll bonded cladding layer 26 applied directly on the core layer 22 (which may have been produced by casting), the cladding layer 26 being comprised of a temperature modifier. A braze-promoting layer 16 as described above is applied on top of the cladding layer 26. The brazing sheet 24 is preferably incorporated into an assembly, either in the form of a sheet or a shaped object, and is brazed to one or more other components in the assembly, the other components comprising either similar or dissimilar metals. When the assembly is heated to a temperature in the range of about 730 to 1130° F. for a sufficient period of time, the low-melting cladding layer 26 and the braze-promoting layer 16 melt and are incorporated into the filler metal, thereby brazing the components together. Although less preferred, it is possible to apply cladding layer 26 and braze-promoting layer 16 to only one side of the core layer 20.

The cladding layer comprises a temperature modifying metal or alloy, preferably the same as the temperature modifier 12 of preform 10, within the limits of rolling mill processibility.

The braze-promoting layer 16 is as described above with reference to the preform, and the core 20 is as described above with reference to the brazing sheet having a temperature modifier layer applied by hot dipping, etc.

In an alternate, related embodiment, the roll-bonded cladding layer 26 simply comprises an aluminum-silicon brazing alloy and a temperature modifier layer comprising zinc is applied on top of the cladding, typically by electroplating. This structure can be obtained merely by plating zinc onto commercially available aluminum brazing sheets which may have a 3xxx-series core alloy and a 4xxx-series cladding alloy.

Core Sheet with Electroplated Temperature Modifier Layer

Figure 4:
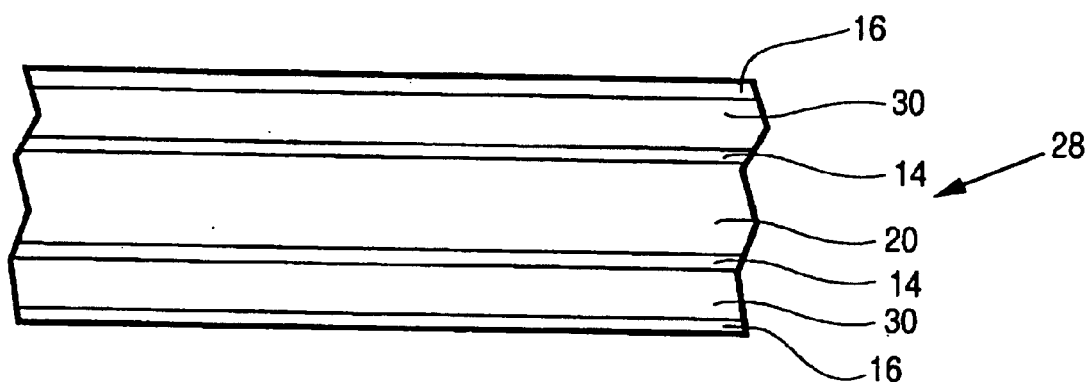
FIG. 4 is a schematic illustration of a preferred brazing sheet according to the invention in which a temperature modifier layer is applied by electroplating.

A preferred structure of this type of brazing sheet 28 is schematically illustrated in FIG. 4, and is similar to the structure shown in FIG. 2. The brazing sheet 28 may preferably comprise a central core layer 20, optional bonding layers 14 on both sides of the core 20, electroplated temperature modifier layers 30 on top of the bonding layers 14, and braze-promoting layers 16 on top of the bonding layers 14. The brazing sheet 28 is preferably incorporated into an assembly, either in the form of a sheet or a shaped object, and is brazed to one or more other components in the assembly, the other components either comprising similar or dissimilar metals. When the assembly is heated to a temperature in the range from about 730 to 1130° F. for a sufficient period of time, the bonding layers 14, temperature modifier layer 30 and the braze-promoting layers 16 melt, and the contacted surfaces of the core or interlayer materials are incorporated into the filler metal which brazes the components together. Although less preferred, it is possible to apply a bonding layer 14, temperature modifier layer 30 and braze-promoting layer 16 to only one side of the core layer 20.

The bonding layers 14 and braze-promoting layers 16 preferably have the compositions described above, and it is to be appreciated that the bonding layers 14 are optional. Where a bonding layer is present, it preferably comprises a very thin zincate or stannate pretreatment, or a thin electroless nickel, nickel-lead or nickel-bismuth pretreatment, as a pretreatment for subsequent fast zinc electroplating. Electroplating solutions utilized in the plating of the braze promoting layers include solutions of nickel sulfate, nickel chloride, sodium citrate, sodium gluconate, sodium acetate, ammonium chloride, ammonium sulfate, ammonium hydroxide and lead acetate as described in U.S. Pat. No. 4,028,200 and as described in the applicants' co-pending application Ser. No. 10/300,836.

The temperature modifier layer 30 is either zinc-based, aluminum-based or copper-based and has a liquidus temperature of about 730 to 1130° F. Most preferably, the temperature modifier layer 30 is comprised of zinc; zinc and nickel; aluminum and zinc; aluminum, zinc and silicon; aluminum, silicon and magnesium, or aluminum, zinc, silicon and magnesium, in relative amounts such that the temperature modifier layer has a liquidus temperature in the range of about 730 to 1130° F. Most preferably, the temperature modifier layer 30 of brazing sheet 28 comprises zinc, zinc-nickel, zinc-aluminum, aluminum-zinc, aluminum-zinc-silicon, aluminum-silicon-magnesium, or aluminum-zinc-silicon-magnesium having a liquidus temperature in the range of about 730 to 1130° F., eg clad brazing sheet with an aluminum-silicon cladding, the filler metal being deposited on the aluminum-silicon eutectic.

The core layer has a melting point high enough that it does not melt during the brazing operation, and has a composition as described above with reference to core layer 20 of brazing sheet 18 shown in FIG. 2. Most preferably, the core layer 20 of brazing sheet 28 is formed from aluminum or an aluminum alloy.

As in the brazing sheet 18 shown in FIG. 2, the brazing sheet 28 may also be provided with a thin, transient barrier coating (not shown) applied at the interface between the core layer 20 and the bonding layer 14, or at the interface between the core layer 20 and the temperature modifier layer 30 where the bonding layer 14 is not present.

The barrier coating is preferably comprised of nickel, nickel-lead or nickel-bismuth and is applied to the core layer 20 or the bonding layer 14 prior to coating with the low-melting temperature modifier. Barrier coatings comprising copper, copper-lead or copper-bismuth may also be preferred in some embodiments, either in addition to, or in substitution for, the nickel-based barrier coating. The barrier coating can preferably be applied by electroless or electrolytic plating.

It may also be preferred in this embodiment to provide a copper-based, preferably copper or copper-tin, layer either directly under or on top of the braze-promoting layer 16. In this case, copper likely behaves more like a temperature modifier than a barrier layer, except perhaps with respect to the facing surface of another contacting member to be brazed.

Brazing Sheet with Temperature Modifier Layer Applied by CVD or PVD

Figure 5:
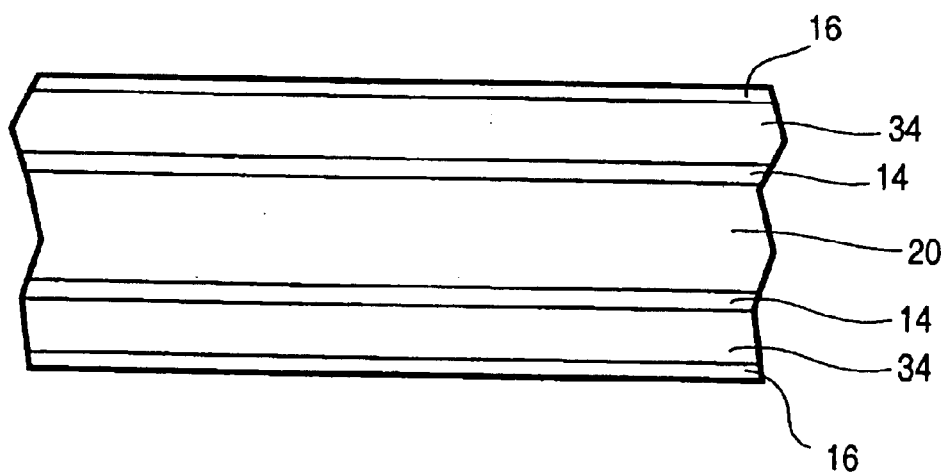
FIG. 5 is a schematic illustration of a preferred brazing sheet according to the invention in which a temperature modifier layer is applied by CVD or PVD.

The preferred structure of this type of brazing sheet 32 is schematically illustrated in FIG. 5, and comprises a central core layer 20, optional bonding layers 14 on both sides of the core 20, CVD or PVD-deposited temperature modifier layers 34 on top of the bonding layers 14, and braze-promoting layers 16 on top of the temperature modifier layers 34. The brazing sheet is preferably incorporated into an assembly, either in the form of a sheet or a shaped object, and is brazed to one or more other components in the assembly, the other components either comprising similar or dissimilar metals. When the assembly is heated to a temperature in the range from about 730 to 1130° F. for a sufficient period of time, the bonding layers 14, temperature modifier layer 34 and the braze-promoting layers 16 melt and are incorporated into the filler metal which brazes the components together. Although less preferred, it is possible to apply a bonding layer 14, temperature modifier layer 34 and braze-promoting layer 16 to only one side of the core layer 20.

The bonding layers 14 and braze-promoting layers 16 preferably have the compositions described above. Furthermore, it is to be understood that the bonding layers 14 are optional and the most preferred bonding layers 14 are those described above which are zinc-based or nickel-based. The temperature modifier layer may preferably have a composition as described above in the context of temperature modifier layer 12 of preform 10.

The core layer has a melting point high enough that it does not melt during the brazing operation, and has a composition as described above with reference to core layer 20 of brazing sheet 18 shown in FIG. 2. Most preferably, the core layer 20 of brazing sheet 28 formed from aluminum or an aluminum alloy.

As with brazing sheets 18 and 28 described above, the brazing sheet 32 according to this embodiment may also be provided with a thin, transient barrier coating (not shown) applied at the interface between the core layer 20 and the bonding layer 14, or at the interface between the core layer 20 and the temperature modifier layer 34 where the bonding layer 14 is not present.

The barrier coating is preferably comprised of nickel, nickel-lead or nickel-bismuth and is applied to the core layer 20 or the bonding layer 14 prior to coating with the low-melting temperature modifier. Barrier coatings comprising copper, copper-lead or copper-bismuth may also be preferred in some embodiments, either in addition to, or in substitution for, the nickel-based barrier coating. The barrier coating can preferably be applied by electroless or electrolytic plating.

Powder Metal Compositions

A further embodiment of the invention exploits the use of powder metal compositions including zinc, aluminum, silicon, nickel and braze modifiers, for example the compositions may include zinc, zinc-aluminum, zinc-silicon, zinc-aluminum-silicon in combination with nickel powders, with or without braze modifiers as described above. Preferably the nickel and braze modifier are added together as nickel-lead or nickel-bismuth powders.

The powder metal mixtures can be applied to an aluminum-containing substrate as a coating, using a suitable binder, by roll compaction into the substrate surface, or as a perform, to form selective or continuous, brazeable coatings. The substrate may comprise aluminum or an aluminum alloy, and may comprise a brazing sheet with an aluminum-silicon cladding. In terms of binders, after exhaustive tests of binders normally used for brazing pastes, including those used for CAB brazing, all of which tend to leave black residues on brazing, or degraded brazing, the inventors have found that particularly effective binders are polymeric binders, preferably propylene carbonate binders, and even more preferably such polymers in the form of aqueous emulsions. One preferred binder is QPAC-40™ from PAC Polymers.

In one specific example, a mixture prepared from a slurry of 90 mg zinc powder, 10 mg nickel powder, 160 mg water, and 40 mg of QPAC emulsion, was successfully brazed with 3003 aluminum.

In the powder coating or roll compaction embodiment, the substrate surface may preferably be pre-conditioned by suitable cleaning pretreatment, or by application of a bonding layer, for example by a zincate or stannate treatment, or by application of a thin pre-coating comprised of nickel, bismuth, lead, nickel-lead, nickel-bismuth, zinc-bismuth, zinc-lead, tin bismuth or tin-lead. For roll compaction application of powder coatings, to high strength alloys such as 2024 aluminum, it may be preferred to use an aluminum clad version of the alloy, ie where the 2024 material is clad with a surface layer of soft, nearly pure aluminum.

An important point in all of these embodiments is that in addition to the objective of achieving a desired low melting filler metal system for the purpose of joining, there is generally inherent dissolution, and alloying together with the filler metal, of the surface layers of the substrate material. Accordingly, by appropriate selection of the filler metal system, it will be appreciated that it may be possible to deliberately adjust the surface alloy composition of the as-brazed material. For example, deliberate use of zinc filler metal systems may be used to enrich the surfaces of an aluminum-brazed product with zinc, for the purposes of sacrificial corrosion protection, or to achieve surface hardening characteristics.

EXAMPLES AND TABLES

Example 1

Table 1 indicates how various combinations of braze filler metal can reduce melting temperatures as aluminum concentrations decrease and zinc concentrations increase, with a sharp temperature decrease occurring at the eutectic at 4% aluminum—96% zinc.

TABLE I

| Al (%) | Zn (%) | Si (%) | Pb (%) | Ta (%) | Bi (%) | ° F. |
|---|---|---|---|---|---|---|
| 0.0 | 100.0 | — | — | — | — | 786 |
| 4.0 | 96.0 | — | — | — | — | 720 |
| 3.5 | 95.0 | — | 1.5 | — | — | 752 |
| 13.0 | 85.3 | 1.2 | — | 0.5 | — | 800 |
| 20.5 | 76.0 | 2.0 | — | — | 1.5 | 850 |
| 29.0 | 66.0 | 3.0 | 2.0 | — | — | 885 |
| 38.2 | 57.0 | 4.8 | — | — | — | 910 |
| 46.5 | 47.5 | 6.0 | — | — | — | 950 |
| 54.8 | 38.0 | 7.2 | — | — | — | 985 |
| 63.1 | 28.5 | 8.4 | — | — | — | 1015 |
| 88.2 | — | 11.8 | — | — | — | 1100 |

The alloys shown in Table 1 were prepared experimentally by casting, rolled into sheet, and then used to determine a successful melting range and also wetting and spreading characteristics. These experiments showed that the introduction of an increasing percentage of zinc to the traditional eutectic aluminum-silicon filler alloy, reduced the melting temperature of the new brazing alloy. The wetting and spreading tests also proved that the zinc-aluminum-silicon systems according to the invention yield alloys feasible for the fluxless brazing of die castings and other components in the neighborhood of 730 to 1130° F., more preferably 750 to 1050° F., as compared to 1080 to 1175° F. for the presently used commercial aluminum-silicon filler metals.

In addition to the aforementioned alloying elements, the brazing composition of the alloys shown in the table may include minor elements and impurities amounts of up to 1.0% iron, 0.25% titanium, 0.25% manganese, 0.2% copper, 0.3% magnesium, etc.

Example 2

Several tensile strength measurements were made with brazed lap specimens, using zinc alone and nickel-lead plated zinc as filler materials (Table 2) to bond type 3003 aluminum to 3003 aluminum.

With respect to the various tests, nos. 1 through 5 uses aluminum type 3003 and zinc foil that is 0.38 mm. thick and nos. 6 through 11 utilize zinc foil which is 0.10 mm. thick. The braze tests were run with type 3003 aluminum as a lap joint with a small sheet of zinc placed between the 3003 aluminum pieces. As shown in table 2, the electroplated nickel-lead on zinc greatly improved the braze quality and strength and made it possible to lower the braze temperature to 900° F.

TABLE 2

| No. | Filler Material | Zinc Thickness (mm) | Braze Promoter | Braze Temp. (° F.) | Braze Quality | Tensile Strength (lb) |
|---|---|---|---|---|---|---|
| 1 | Zinc | 0.38 | — | 1120 | Good | 455 |
| 2 | Zinc | 0.38 | Ni—Pb | 950 | Good | 490 |
| 3 | Zinc | 0.38 | — | 950 | Poor | 90 |
| 4 | Zinc | 0.38 | Ni—Pb | 900 | Good | 548 |
| 5 | Zinc | 0.38 | — | 900 | Poor | 80 |
| 6 | Zinc | 0.10 | — | 900 | No Braze | — |
| 7 | Zinc | 0.10 | Ni—Pb | 900 | Good | 536 |
| 8 | Zinc | 0.10 | — | 950 | No Braze | — |
| 9 | Zinc | 0.10 | — | 1000 | No Braze | — |
| 10 | Zinc | 0.10 | — | 1050 | No Braze | — |
| 11 | Zinc | 0.10 | — | 1100 | Poor | <100 |

Example 3

A second group of tests were conducted as in Example 2 but with a shorter lap joint in the order of 0.25 inches using 3003 aluminum specimens. For all tests, a small piece of zinc metal was placed between the aluminum specimens and, as shown in table 3, the braze temperature was lowered to 800° F. when nickel-lead was electroplated on the zinc spacer.

TABLE 3

| No. | Filler Material | Braze Promoter | Braze Temp. (° F.) | Braze Quality | Tensile Strength (lb) |
|---|---|---|---|---|---|
| 1 | Zinc | Ni—Pb | 850 | Good | 648 |
| 2 | Zinc | Ni—Pb | 800 | Good | 580 |
| 3 | Zinc | — | 1100 | Poor | 136 |
| 4 | Zinc | Ni—Pb | 900 | Good | 516 |
| 5 | Zinc | — | 1000 | No Braze | — |

Example 4

In additional testing, small samples of zinc alloys were prepared in a tube furnace and in an arc-melting chamber. The alloys were then roll milled to form thin sheets and braze tests were run with the thin alloy sheet placed between a 3003 aluminum tube and plate. Results of these tests are shown in table 4 and show some variations in braze quality.

TABLE 4

| No. | Alloy | Filler Material % Comp. | | | Braze Promoter | Thickness (mils) | Braze Tem. (° F.) | Braze Quality |
|---|---|---|---|---|---|---|---|---|
| | | Zn | Al | Si | | | | |
| 1 | I | 100 | — | — | Ni—Pb | 9 | 820 | Excel. |
| 2 | I | 100 | — | — | — | 9 | 900 | Poor |
| 3 | VI | 100 | — | — | Ni—Pb | 15 | 820 | Good |
| 4 | III | 90 | 8.8 | 1.2 | Ni—Pb | 10 | 1000 | Good |
| 5 | V | 90 | 8.8 | 1.2 | Ni—Pb | 14 | 1000 | Excel. |
| 6 | V | 90 | 8.8 | 1.2 | Ni—Pb | 14 | 900 | Excel. |
| 7 | V | 90 | 8.8 | 1.2 | Ni—Pb | 14 | 850 | Good |

With respect to the alloys listed in table 4, alloys I & III were arc melted, and alloys V & VI were cast in air and the center (non oxidized) section was used. It appears from the above cited results and from additional testing to be disclosed that the braze quality is good to excellent even with the zinc-aluminum-silicon alloy if the nickel-lead promoter is added.

Further test results of zinc-aluminum-silicon-alloy braze joints are listed in table 5.

TABLE 5

| No. | Alloy | Filler Material % Composition Zn | Al | Si | Thickness (mils) | Braze Promoter | Braze Temp. (° F.) | Braze Quality |
|---|---|---|---|---|---|---|---|---|
| 1 | VII | 100 | — | — | 5 | Ni—Pb | 900 | Good |
| 2 | VII | 100 | — | — | 5 | — | 900 | Poor |
| 3 | VIII | 100 | — | — | 5 | Ni—Pb | 900 | Good |
| 4 | IX | 100 | — | — | 6 | Ni—Pb | 900 | Good |
| 5 | XI | 98 | 2 | — | 5 | Ni—Pb | 900 | Excellent |
| 6 | XI | 98 | 2 | — | 5 | — | 900 | No braze |
| 7 | VIII & XII | 90 | 8.8 | 1.2 | 4 | Ni—Pb | 900 | Good |
| 8 | VIII & XII | 90 | 8.8 | 1.2 | 7 | Ni—Pb | 900 | Fair |
| 9 | VIII & XII | 90 | 8.8 | 1.2 | 7 | — | 900 | No Braze |

With respect to the alloys shown in column 2, alloy VII is zinc received from Alpha Co.; alloy VIII is Alpha Co. zinc melted in a nitrogen furnace at 900° F. and roll milled to a thin sheet; alloy IX is zinc wire from Tafa Co. melted in a furnace with a nitrogen atmosphere at 900° F. followed by rolling to a thin sheet; alloy XI is a metal strip 0.022 inches thick containing 98% zinc and 2% aluminum; and alloy XII is a cast alloy consisting of 88% aluminum and 12% silicon, again roll milled into a thin sheet.

Example 5

Braze tests were also conducted using a type 3003 aluminum tube on aluminum sheet with pure zinc, 98 zinc—2 aluminum, and 90 zinc—8.8 aluminum—1.2 silicon shim stock as a filler material. Good braze joints were obtained from nickel-lead plating the filler material, while a poor joint was obtained without the nickel plate.

Example 6

To determine whether any differences exist, between nickel plate on zinc and nickel-lead plate on zinc, another series of braze and tensile tests were conducted using aluminum alloys AA2024, 3003, 5052 and 7075. The aluminum thickness of the tensile bars was increased to 0.090 inch make the break more likely to occur at the braze joint than in the aluminum price. A small section (0.75×0.20× 0.045 inch) was cut out of the aluminum bar (2.0×0.75× 0.090 inch) for placing the zinc between the two mating tensile bars. The samples were brazed at 800 or 825° F. As shown in Tables 6–13 the tensile strength increased in all tests when the zinc was electroplated with nickel and lead.

TABLE 6

Tensile Strength Measurements with Zinc* and Aluminum 2024** Brazed at 800° F.

| Test No. | Aluminum Cleaning | Metal Plated on Zinc | Braze Quality | Tensile Strength (pounds) | Break Point*** |
|---|---|---|---|---|---|
| 24-1 | Acetone | — | No braze | — | — |
| 24-2 | Acetone | — | No braze | — | — |
| 24-3 | Acetone | Nickel | Good | 210 | BJ |
| 24-4 | Acetone | Nickel | Good | 288 | BJ |
| 24-5 | Acetone | Ni—Pb | Good | 456 | BJ |
| 24-6 | Acetone | Ni—Pb | Good | 590 | Al Alloy |
| 24-7 | Caustic | — | Good | 32 | BJ |
| 24-8 | Caustic | — | Good | 168 | BJ |
| 24-9 | Caustic | Nickel | Good | 568 | BJ |
| 24-10 | Caustic | Nickel | Good | 800+ | Al Alloy |
| 24-11 | Caustic | Ni—Pb | Good | 616 | BJ |

*Zinc Shim Stock Size (in) = 0.2 × 0.75 × 0.015
**Aluminum Specimen Size (in) = 2 × 0.75 × 0.09 with cut-out of 0.2 × 0.75 × 0.045
***BJ—break occurred at the braze joint

TABLE 7

Tensile Strength Measurements with Zinc* and Aluminum 2024** Brazed at 825° F.

| Test No. | Aluminum Cleaning | Metal Plated on Zinc | Braze Quality | Tensile Strength (pounds) | Break Point*** |
|---|---|---|---|---|---|
| 31-1 | Acetone | — | No braze | — | — |
| 31-2 | Acetone | — | No braze | — | — |
| 31-3 | Acetone | Nickel | Good | 280 | BJ |
| 31-4 | Acetone | Nickel | Good | 200 | BJ |
| 31-5 | Acetone | Ni—Pb | Fair | 570 | Al Alloy |
| 31-6 | Acetone | Ni—Pb | Good | 570 | Al Alloy |
| 31-7 | Caustic | — | Poor | 80 | BJ |
| 31-8 | Caustic | — | Poor | 60 | BJ |
| 31-9 | Caustic | Nickel | Good | 350 | BJ |
| 31-10 | Caustic | Nickel | Good | 370 | BJ |
| 31-11 | Caustic | Ni—Pb | Good | 620 | Al Alloy |
| 31-12 | Caustic | Ni—Pb | Good | 660 | Al Alloy |

*Zinc Shim Stock Size (in) = 0.2 × 0.75 × 0.015
**Aluminum Specimen Size (in) = 2 × 0.75 × 0.09 with cut-out of 0.2 × 0.75 × 0.045
***BJ—break occurred at the braze joint

TABLE 8

Tensile Strength Measurements with Zinc* and Aluminum 3003** Brazed at 800° F.

| Test No. | Aluminum Cleaning | Metal Plated on Zinc | Braze Quality | Tensile Strength (pounds) | Break Point*** |
|---|---|---|---|---|---|
| 25-1 | Acetone | — | No braze | — | — |
| 25-2 | Acetone | — | No braze | — | — |
| 25-3 | Acetone | Nickel | Good | 280 | BJ |
| 25-4 | Acetone | Nickel | Good | 40 | BJ |

TABLE 8-continued

Tensile Strength Measurements with Zinc* and Aluminum 3003** Brazed at 800° F.

| Test No. | Aluminum Cleaning | Metal Plated on Zinc | Braze Quality | Tensile Strength (pounds) | Break Point*** |
|---|---|---|---|---|---|
| 25-5 | Acetone | Ni—Pb | Good | 445 | Al Alloy |
| 25-6 | Acetone | Ni—Pb | Good | 430 | Al Alloy |
| 25-7 | Caustic | — | Good | 75 | BJ |
| 25-8 | Caustic | — | Good | 300 | BJ |
| 25-9 | Caustic | Nickel | Good | 370 | BJ |
| 25-10 | Caustic | Nickel | Good | 365 | BJ |
| 25-11 | Caustic | Ni—Pb | Good | 510 | Al Alloy |

*Zinc Shim Stock Size (in) = 0.2 × 0.75 × 0.015
**Aluminum Specimen Size (in) = 2 × 0.75 × 0.09 with cut-out of 0.2 × 0.75 × 0.045
***BJ—break occurred at the braze joint

TABLE 9

Tensile Strength Measurements with Zinc* and Aluminum 3003** Brazed at 825° F.

| Test No. | Aluminum Cleaning | Metal Plated on Zinc | Braze Quality | Tensile Strength (pounds) | Break Point*** |
|---|---|---|---|---|---|
| 30-1 | Acetone | — | No braze | — | — |
| 30-2 | Acetone | — | No braze | — | — |
| 30-3 | Acetone | Nickel | Good | 430 | BJ |
| 30-4 | Acetone | Nickel | Good | 250 | BJ |
| 30-5 | Acetone | Ni—Pb | Good | 460 | Al Alloy |
| 30-6 | Acetone | Ni—Pb | Good | 470 | Al Alloy |
| 30-7 | Caustic | — | No braze | — | — |
| 30-8 | Caustic | — | No braze | — | — |
| 30-9 | Caustic | Nickel | Good | 310 | BJ |
| 30-10 | Caustic | Nickel | Good | 150 | BJ |
| 30-11 | Caustic | Ni—Pb | Good | 480 | Al Alloy |
| 30-12 | Caustic | Ni—Pb | Good | 470 | Al Alloy |

*Zinc Shim Stock Size (in) = 0.2 × 0.75 × 0.015
**Aluminum Specimen Size (in) = 2 × 0.75 × 0.09 with cut-out of 0.2 × 0.75 × 0.045
***BJ—break occurred at the braze joint

TABLE 10

Tensile Strength Measurements with Zinc* and Aluminum 5052** Brazed at 800° F.

| Test No. | Aluminum Cleaning | Metal Plated on Zinc | Braze Quality | Tensile Strength (pounds) | Break Point*** |
|---|---|---|---|---|---|
| 27-1 | Acetone | — | Poor | 55 | BJ |
| 27-2 | Acetone | — | No braze | — | — |
| 27-3 | Acetone | Nickel | Good | 385 | BJ |
| 27-4 | Acetone | Nickel | Good | 380 | BJ |
| 27-5 | Acetone | Ni—Pb | Good | 665 | BJ |
| 27-6 | Acetone | Ni—Pb | Good | 575 | BJ |
| 27-7 | Caustic | — | Fair | 90 | BJ |
| 27-8 | Caustic | — | Fair | 60 | BJ |
| 27-9 | Caustic | Nickel | Good | 420 | BJ |
| 27-10 | Caustic | Nickel | Good | 210 | BJ |
| 27-11 | Caustic | Ni—Pb | Good | 640 | BJ |
| 27-12 | Caustic | Ni—Pb | Good | 510 | BJ |

*Zinc Shim Stock Size (in) = 0.2 × 0.75 × 0.015
**Aluminum Specimen Size (in) = 2 × 0.75 × 0.09 with cut-out of 0.2 × 0.75 × 0.045
***BJ—break occurred at the braze joint

TABLE 11

Tensile Strength Measurements with Zinc* and Aluminum 5052** Brazed at 825° F.

| Test No. | Aluminum Cleaning | Metal Plated on Zinc | Braze Quality | Tensile Strength (pounds) | Break Point*** |
|---|---|---|---|---|---|
| 32-1 | Acetone | — | Good | 110 | BJ |
| 32-2 | Acetone | — | Good | 80 | BJ |
| 32-3 | Acetone | Nickel | Good | 50 | BJ |
| 32-4 | Acetone | Nickel | Good | 180 | BJ |
| 32-5 | Acetone | Ni—Pb | Good | 800 | BJ |
| 32-6 | Acetone | Ni—Pb | Good | 630 | BJ |
| 32-7 | Caustic | — | Good | 240 | BJ |
| 32-8 | Caustic | — | No braze | | |
| 32-9 | Caustic | Nickel | | | |
| 32-10 | Caustic | Nickel | Good | 360 | BJ |
| 32-11 | Caustic | Ni—Pb | Good | 880 | Al Alloy |
| 32-12 | Caustic | Ni—Pb | Good | 680 | BJ |

*Zinc Shim Stock Size (in) = 0.2 × 0.75 × 0.015
**Aluminum Specimen Size (in) = 2 × 0.75 × 0.09 with cut-out of 0.2 × 0.75 × 0.045
***BJ—break occurred at the braze joint

TABLE 12

Tensile Strength Measurements with Zinc* and Aluminum 7075** Brazed at 800° F.

| Test No. | Aluminum Cleaning | Metal Plated on Zinc | Braze Quality | Tensile Strength (pounds) | Break Point*** |
|---|---|---|---|---|---|
| 34-1 | Acetone | — | No braze | — | — |
| 34-2 | Acetone | — | No braze | — | — |
| 34-3 | Acetone | Nickel | Good | 360 | BJ |
| 34-4 | Acetone | Nickel | Good | 40 | BJ |
| 34-5 | Acetone | Ni—Pb | Good | 680 | BJ |
| 34-6 | Acetone | Ni—Pb | Good | 680 | BJ |
| 34-7 | Caustic | — | No braze | — | — |
| 34-8 | Caustic | — | No braze | — | — |
| 34-9 | Caustic | Nickel | Good | 390 | BJ |
| 34-10 | Caustic | Nickel | Good | 430 | BJ |
| 34-11 | Caustic | Ni—Pb | Good | 700 | BJ |
| 34-12 | Caustic | Ni—Pb | Good | 770 | BJ |

*Zinc Shim Stock Size (in) = 0.2 × 0.75 × 0.015
**Aluminum Specimen Size (in) = 2 × 0.75 × 0.09 with cut-out of 0.2 × 0.75 × 0.045
***BJ—break occurred at the braze joint

TABLE 13

Tensile Strength Measurements with Zinc* and Aluminum 7075** Brazed at 825° F.

| Test No. | Aluminum Cleaning | Metal Plated on Zinc | Braze Quality | Tensile Strength (pounds) | Break Point*** |
|---|---|---|---|---|---|
| 33-1 | Acetone | — | No braze | — | — |
| 33-2 | Acetone | — | Good | 20 | BJ |
| 33-3 | Acetone | Nickel | Good | 20 | BJ |
| 33-4 | Acetone | Nickel | Good | 460 | BJ |
| 33-5 | Acetone | Ni—Pb | Good | 610 | Al Alloy |
| 33-6 | Acetone | Ni—Pb | Good | 600 | Al Alloy |
| 33-7 | Caustic | — | Good | 180 | BJ |
| 33-8 | Caustic | — | Good | 30 | BJ |
| 33-9 | Caustic | Nickel | Good | 480 | BJ |
| 33-10 | Caustic | Nickel | Good | 650 | BJ |
| 33-11 | Caustic | Ni—Pb | Good | 715 | Al Alloy |
| 33-12 | Caustic | Ni—Pb | Good | 770 | BJ |

*Zinc Shim Stock Size (in) = 0.2 × 0.75 × 0.015
**Aluminum Specimen Size (in) = 2 × 0.75 × 0.09 with cut-out of 0.2 × 0.75 × 0.045
***BJ—break occurred at the braze joint

Example 7

Additional tests were performed on AA6061 and AA6262 aluminum transmission oil cooler fittings for brazing to non-clad type 3003 aluminum, using zinc filler metal. (Table 14). The zinc was plated with standard Long Manufacturing nickel plating solution and all samples were brazed at 800° F. in a laboratory furnace. The two samples that were not nickel-plated did not braze well, indicating that nickel-lead plating on zinc was needed for an acceptable braze joint as shown in Table 14.

TABLE 14

| Test No. | Fitting Size OD × ID × HT | Filler Material | Braze Promoter | Braze Quality |
|---|---|---|---|---|
| 1 | 1.22 × 0.43 × 0.43 | Zinc | Ni—Pb | Good |
| 3 | 1.22 × 0.50 × 1.58 | Zinc | Ni—Pb | Excellent |
| 5 | 1.22 × 0.43 × 0.43 | Zinc | — | No Braze |
| 6 | 1.30 × 0.57 × 0.72 | Zinc | Ni—Pb | Excellent |
| 7 | 1.30 × 0.57 × 0.72 | Zinc | — | Fair |
| 8 | 1.22 × 0.50 × 1.58 | Zinc | Ni—Pb | Good |

The zinc was in the form of a 0.38 mm. (0.015 inch) thick foil from BDH Chemicals.

Example 8

Also tested were two thermal spray techniques for applying metallic coatings, flame spray and electric arc spray. The metals, (zinc and aluminum—12% silicon, in wire form) were vaporized or melted and atomized to form coatings on AA3003 aluminum using the electric-arc process in a nitrogen atmosphere. They were sprayed from a distance of 8 inches with the electric power controlled at approximately 22 to 25 volts and 100+ amps. Braze tests were run using 3003 aluminum tubes placed on top of the thermal spray coated coupons. The best results were obtained with thermal sprayed zinc, or aluminum—12% silicon alloy subsequently electroplated with a nickel-lead coating and brazed at 900° F. (see Table 15). However, the braze quality was poorer than that obtained using nickel-plated zinc shim stock.

TABLE 15

| | Thermal Spray Metal Coating | | Braze | Braze |
|---|---|---|---|---|
| Test No. | First Layer | Top Layer | Promoter | Quality |
| 1 | Zinc | — | — | Poor |
| 2 | Zinc | — | Ni—Pb | Fair |
| 3 | Zinc | Al-12% | — | Poor |
| 4 | Zinc | Al-12% | Ni—Pb | Fair |

Example 9

Braze tests were run with aluminum tubing sections on top of 3003 aluminum sheet with powder metal at the tubing sheet joint.

With zinc and nickel powder metals the best braze quality was obtained with a powder metal composition of 3 to 4% nickel and 96–97% zinc. The inner diameter braze joint showed excellent fillet formation compared with the outer diameter. Without zinc, using mixtures of aluminum, silicon and nickel powder, it was found necessary to increase the temperature and time to obtain good braze joints. The best braze joints were obtained with powder compositions of 50 to 70% aluminum, 11 to 17% silicon and 13 to 33% nickel. When silicon powder was omitted from the aluminum-silicon-nickel mix, no brazing occurred.

Example 10

Braze tests were run with copper and copper alloy substrates, using zinc and zinc-aluminum filler materials. This included limited trials of copper plating as a transient barrier coating for zinc diffusion, to limit formation of brittle compounds.

TABLE 16

Results of braze test on copper and copper alloy substrates

| Test No | Substrate | Filler Metal (0.38 mm thick Shim Washer) | Braze Promoter Coating | Braze Temperature | Braze Quality |
|---|---|---|---|---|---|
| 1 | C24000 Brass | Zn | None | 850 F. | Fair |
| 2 | " | " | " | 800 F. | Good |
| 3 | " | Zn | Ni—Pb | 850 F. | Good |
| 4 | " | " | " | 800 F. | Excellent |
| 5 | C26000 Brass | Zn | None | 850 F. | Fair |
| 6 | " | " | Ni—Pb | 800 F. | Excellent |

Braze time was 4–5 minutes up to temperature

TABLE 17

More Copper Alloy Substrate Results

| Test No | Tube | Plate | Filler Metal | Braze Promoter | Braze Quality at 825 F. |
|---|---|---|---|---|---|
| 67-1 & 2 | C11000 | C11000 | Zn Foil | None | Poor |
| 67-3 & 4 | " | " | " | Ni | Poor |
| 67-5 & 6 | " | " | " | Ni—Pb | Good |
| 69-1 & 2 | " | C26000 | " | None | Poor |
| 69-3 & 4 | " | " | " | Ni | Poor |
| 69-5 & 6 | " | " | " | Ni—Pb | Good |

Note;
Zn foil 0.10" thick, 1" × 1" shim

TABLE 18

Tensile Results for C26000 Brass Brazed with Zinc Filler Metal, at 850 F.

| Test No | Substrate Thickness | Braze Promoter Coating | Braze Quality | Tensile Strength (lbs) | Break Point |
|---|---|---|---|---|---|
| 47-1 | 0.093 in | None | Good | 465 | BJ |
| -2 | " | " | " | 340 | " |
| -3 | " | Ni | " | 445 | " |
| -4 | " | " | " | 415 | " |
| -5 | " | Ni—Pb | " | 410 | " |
| -6 | " | " | " | 390 | " |
| 47-7 | " | Cu | " | 405 | " |
| 47-9 | " | Cu/Ni | " | 380 | " |
| -10 | " | " | " | 510 | " |
| -11 | " | Cu/Ni—Pb | " | 510 | " |
| 47-12 | " | " | " | 560 | " |

Conclusion—considering that 850 F is not necessarily the best discriminating temperature, general points seem to be:
  zinc alone can braze copper in nitrogen, at temperatures of 850° F. and above
  addition of Ni coating does not appear to significantly help, in this particular case (ie pure zinc, and copper substrate).
  addition of Ni—Pb coating significantly improves wetting and braze quality at low temperature tested, for zinc alloy filler metals, for example Zn 2% aluminum, and for copper alloy substrates such as C260 brass.

in case of brass substrates, zinc alone has somewhat degraded braze quality vs copper; increasing zinc content in brass causes decrease in strength or increased brittleness; especially going to C260, and then C360 leaded brass fittings (not shown). Use of Cu barrier coating in combination with Ni or Ni—Pb coating, seems to significantly increase strength, when brazed at 850 F. Presumably this is because the Cu plating acts as a barrier to delay formation of Zn-rich intermetallics. In this example, the copper barrier coatings were applied to the zinc shim filler metal by electroplating copper from a copper pyrophosphate plating bath; and, in some tests, by subsequently applying a Ni—Pb electroplate on top of the copper.

Example 11

Braze tests were run with aluminum eutectic casting, alloy A 413.1. The casting was machined into elongated pieces and configured as a lap joint for brazing. Brazing was in nitrogen, with approximately 5 minutes at braze temperature. In all cases, Ni—Pb was plated with a standard Long Manufacturing plating bath composition.

The results of these braze tests are shown below in Table 19

TABLE 19

| Sample Particulars | 71–5 | 71–6 | 71–7 | 74–6 |
| --- | --- | --- | --- | --- |
| Substrate Treatment | Ni/Pb plated | None | Ni/Pb plated | Ni/Pb plated |
| Filler Metal Alloy | Zn | Zn 2% Al | Zn 2% Al | Zn 2% Al |
| Filler Metal Treatment | Ni/Pb plated | Ni/Pb plated | Ni/Pb plated | Ni/Pb plated |
| Braze Temp | 900 F. | 900 F. | 900 F. | 950 F. |

Example 12

A coupon of #12 brazing sheet (clad with 4343 alloy) was treated by zincating, and then applying an electroplated Ni—Pb bonding layer [20 sec plating time, Ref P1]; immediately following this, the coupon was electroplated for 1–3 minutes in a Zinc Plating bath [Ref P3]; and then plated with Ni—Pb, for an additional 1 minute. The plated coupon was assembled against the cut end of an AA3003 tube (untreated), and fluxless brazed in flowing nitrogen at 1110° F. An excellent braze joint was obtained.

Example 13

Samples of a HydroGalv™ zinc coated aluminum tube extrusion (without preflux) were obtained from Hydro Aluminum Co (extrusion as-supplied was arc-sprayed with zinc to a thickness of approximately 4–6 microns). Sample pieces of these tubes were place in overlapping contact with a) each other, ie mating faces were zinc coated, b) untreated #12 brazing sheet, and c) a brazing sheet clad with 4045+0.2% Mg, and plated with Ni—Pb [2 minute electroplate, Ref P1] the test specimens were then subjected to a braze cycle to 1120 F in flowing nitrogen, without flux. In the case of test sample a) a fair to good bond was obtained, with some surface oxidation. Test sample b) showed a poor braze quality, and weak bond strength. Test sample c) showed excellent braze response, and the highest bond strength of this test series.

Example 14

An AA3003 coupon was zincated [Ref p2] and then electroplated for 3 minutes with Zinc, using a zinc sulfate bath [Ref P3]; a short length of untreated AA3003 tube was placed on the coupon (ring on plate configuration) and subjected to a fluxless braze cycle at 1120 F, in flowing nitrogen. No braze was obtained, and the zinc plated surface was oxidized [Sample 0–1]. A second identical coupon was prepared, however after Zinc plating, this coupon was also Ni—Pb plated for 2 minutes [Ref P1]. Brazing at 1120 F resulted in a good braze.[Sample FL 21-1]. A third identical sample was prepared, except that #12 brazing sheet (clad with AA4343 Al—Si alloy) was used as the substrate material. Again, the zinc plated coupon was plated with Ni—Pb, and again a good braze was obtained under the same conditions without the use of a flux.[Sample FL 21-2].

Example 15

An identically zincated and zinc-plated coupon (as in the first test in Example 14) was next used to braze to an untreated AA3003 tube, however in this instance a zinc shim, smaller in size than the coupon face, and plated both sides with Ni—Pb (Ref P1) was inserted between the coupon face and the tube end. A fluxless brazing test was then run at 430 C. In comparison to the first test in Example 14, the zinc shim was observed to melt and initiate wetting of the coupon surface, and also to form fillets at the tube/coupon interface. [Sample 1]

Example 16

In the same fashion as example 15, an AA3003 coupon was zincated, plated for 2–4 minutes with Ni—Pb [Ref P1]; and then assembled against an untreated cut AA3003 tube, with an intermediate untreated zinc shim. A fluxless braze test was run at 430 C. In comparison to Example 20, the zinc shim melted and showed excellent wetting on the Ni-plated coupon, and good but discontinuous fillets against the tube wall. A repeat test run exactly the same way, except with the coupon plated for only 1 minute, and the AA3003 tube also 1 minute Ni—Pb plated, resulted in complete wetting and filleting of both the coupon and tube surfaces. [Samples 29/30, and 31].

Example 17

Example 16 was repeated using an AA4343 clad #12 brazing sheet coupon, Ni—Pb plated for 2 minutes, with the Zinc shim also plated with Ni—Pb for 2 minutes, but with the AA3003 tube untreated. Fluxless brazing at 430 C resulted in complete melting of the shim, very good wetting of the coupon face, and large although somewhat discontinuous braze fillets against the tube wall. [Sample IV-C]

Example 18

An AA3003 coupon was prepared by zincating [Ref P2], followed by deposition of a 10 sec Cu electroplated barrier coating [Ref P4]. A Zinc shim Ni—Pb plated for 2 minutes was placed between the prepared 3003 coupon, and an untreated 3003 tube, and fluxless brazed in nitrogen at 430 C. The zinc shim melted and wet the copper plated coupon surface, and a continuous fillet was formed against the untreated tube. [Sample FL1119]

Example 19

An AA3003 coupon was prepared by zincating, 2 minute Ni—Pb plating [Ref P1], Copper plating [20 sec]; a zinc shim was 2 minute Ni—Pb plated on both sides, and place between the prepared coupon and untreated 3003 tube. This assembly was fluxless brazed at 480 C in nitrogen. Excellent wetting of the coupon, and complete braze fillets against the tube wall, resulted.[Sample FL 1120]

Example 20

An AA3003 coupon was zincated, and the following sequence of electroplated coatings applied: 1 minute Ni—Pb flash plating, 12 minutes of Zinc electroplating [Ref P3], 1 minute plating of Ni—Pb, and finally 10 sec copper plating [Ref P4]. This coupon was assembled against an untreated AA3003 tube, with no additional filler metal supplied, and fluxless brazed at 480° C. The zinc, copper and nickel were found to completely inter-alloy and melt, to create a well-wetted coupon surface, but only fair fillets against the tube wall.[Sample ZnCuO$_2$]

References:

[P1]—Ni—Pb Plating Bath 70 g/l NiSO$_4$.6H$_2$O 30 g/l NiCl$_2$.6H$_2$O 120 g/l sodium citrate dihydrate 50 g/l NH$_4$Cl 20 g/l sodium acetate trihydrate 30 ml NH$_4$OH(29% solution)

1 g/l lead acetate trihydrate pH~8.2

Temperature 35° C.

[P2]—Zincate 120 g/l NaOH 20 g/l ZnO 50 g/l Rochelle Salt 2 g/l FeCl$_3$.6H$_2$O 1 g/l NaNO$_3$ Ambient Temperature

[P3]—Zinc Sulfate Plating Bath 360 g/l ZnSO$_4$.6H$_2$O 30 g/l NH$_4$Cl 15 g/l sodium acetate trihydrate pH~5

Ambient Temperature

[P4]—Copper Sulfate Plating Bath

200 G/L CUSO$_4$.5H$_2$O 50 g/l H$_2$SO$_4$ 100 ppm Cl$^-$ as CuCl$_2$

Ambient Temperature

Zinc shims were 100% Zinc, 0.38 mm thick.

Example 21

Example 21—This relates to low temperature fluxless brazing of A413.1 aluminum die-castings. Type A 413.1 die castings were obtained from US Reduction Co., these are a eutectic composition, and so are not brazeable by normal Al—Si filler metals. The received castings were machined into elongated test pieces, which were then overlapped to form braze joints. The cast pieces were treated after machining by immersion caustic etch, acid desmutting and rinsing; and were preferably immediately plated with Ni—Pb [Ref P1]. The filler metal was provided as zinc (0.023") and zinc—2% aluminum (0.015") shimstock. The Zinc or Zinc alloy filler metal was plated with Ni—Pb, and used for test brazing of the die-castings at 900 and 950 F. Braze quality was evaluated visually and by metallographic examination. Braze quality was found to be excellent using the Ni—Pb plated zinc filler metal, and good using the plated Zn 2% Al alloy. Brazing at 900 F resulted in decreased porosity in the braze joints vs 950 F; porosity from dissolved gases in die castings traditionally restricts the brazeability of these materials, and the demonstrated ability to fluxless braze these castings at temperatures at 900 F or lower is a significant benefit.

What is claimed is:

1. A brazing product for low temperature, fluxless brazing, comprising:
    (a) a first temperature modifier layer comprising zinc in an amount of about 25 to 100% by weight of the first temperature modifier layer, the first temperature modifier layer having a liquidus temperature in the range of about 382 to 61° C.; and
    (b) a braze-promoting layer provided on top of the first temperature modifier layer, the braze-promoting layer comprising one or more metals selected from the group consisting of nickel, cobalt and iron;
    wherein heating of the brazing product to a temperature within the range from about 382 to 610° C. results in formation of a filler metal, the filler metal comprising the first temperature modifier layer and the braze-promoting layer and having a zinc content from about 25 to 100% by weight.

2. The brazing product according to claim 1, wherein the zinc content of the filler metal is at least 50% by weight.

3. The brazing product according to claim 1, wherein the zinc content of the filler metal is from about 90 to 100% by weight.

4. The brazing product according to claim 1, wherein the first temperature modifier layer and the filler metal further comprise one or more metals selected from the group consisting of aluminum, copper, nickel, silicon, magnesium, antimony, bismuth, lead, thallium, lithium and strontium.

5. The brazing product according to claim 4, wherein the first temperature modifier layer and the filler metal further comprise aluminum.

6. The brazing product according to claim 5, wherein aluminum is present in the first temperature modifier layer and/or the filler metal in an amount of up to about 65% by weight.

7. The brazing product according to claim 6, wherein aluminum is present in the first temperature modifier layer and/or the filler metal in an amount of up to about 10% by weight.

8. The brazing product according to claim 4, wherein the first temperature modifier layer and the filler metal further comprise silicon.

9. The brazing product according to claim 8, wherein silicon is present in the first temperature modifier layer and/or the filler metal in an amount of up to about 18% by weight.

10. The brazing product according to claim 9, wherein silicon is present in the first temperature modifier layer and/or the filler metal in an amount of up to about 1.2% by weight.

11. The brazing product according to claim 4, wherein the first temperature modifier layer is comprised of zinc or an alloy selected from the group consisting of zinc and nickel; zinc and aluminum; zinc, aluminum and silicon; zinc and antimony; and zinc and silicon.

12. The brazing product according to claim 4, wherein the first temperature modifier layer is comprised of zinc or an alloy selected from the group consisting of zinc-nickel, zinc-antimony, zinc-aluminum, aluminum-zinc, aluminum-zinc-silicon, aluminum-zinc-silicon-magnesium and aluminum-silicon-zinc-copper.

13. The brazing product according to claim 1, wherein the first temperature modifier layer comprises zinc, aluminum and silicon, wherein aluminum is present in an amount of up to about 10 percent by weight; zinc is present in an amount of about 90 to 100 percent by weight; and silicon is present in an amount of up to about 1.2 percent by weight.

14. The brazing product according to claim 1, wherein the first temperature modifier layer has a thickness of from 0.10 to 0.38 mm.

15. The brazing product according to claim 1, wherein the liquidus temperature of the filler metal is about 399 to 566° C.

16. The brazing product according to claim 1, wherein the liquidus temperature of the filler metal is about 421 to 566° C.

17. The brazing product according to claim 1, wherein the braze-promoting layer comprises nickel.

18. The brazing product according to claim 17, wherein the braze-promoting layer further comprises, as alloying elements or impurities, one or more elements selected from the group consisting of cobalt, iron, lead, bismuth, magnesium, lithium, antimony and thallium.

19. The brazing product according to claim 17, wherein the braze-promoting layer is nickel-based and comprises nickel, nickel-bismuth, nickel-lead, nickel-cobalt, nickel-bismuth-cobalt, nickel-lead-cobalt, nickel-lead-bismuth or nickel-bismuth-antimony.

20. The brazing product according to claim 19, wherein the braze-promoting layer comprises nickel-lead or nickel-bismuth, and wherein the content of lead or bismuth in the braze-promoting layer is up to about 10% by weight of the braze-promoting layer.

21. The brazing product according to claim 1, wherein the braze-promoting layer has a thickness of up to about 2.0 microns.

22. The brazing product according to claim 22, wherein the braze-promoting layer has a thickness of about 0.05 to 1.0 microns.

23. The brazing product according to claim 1, further comprises a bonding layer between the first temperature modifier layer and the braze-promoting layer, and wherein the filler metal further comprises the bonding layer.

24. The brazing product according to claim 23, wherein the bonding layer is comprised of one or more metals selected from the group consisting of zinc, tin, lead, bismuth, nickel, antimony, magnesium, lithium and thallium.

25. The brazing product according to claim 24, wherein the bonding layer is comprised of at least 50% by weight zinc or tin.

26. The brazing product according to claim 23, wherein the bonding layer has a thickness of up to about 0.5 microns.

27. The brazing product according to claim 23, wherein the bonding layer has a thickness of about 0.01 to about 0.15 microns.

28. The brazing product according to claim 1, comprising a brazing preform.

29. The brazing product according to claim 28, wherein the brazing preform comprises a sheet, foil, shim, wire or rod.

30. The brazing product according to claim 1, further comprising a core layer having a melting temperature above 610° C. so that it does not substantially melt during brazing, wherein the first temperature modifier layer is provided on top of the core layer.

31. The brazing product according to claim 30, wherein the first temperature modifier layer is applied to the core layer by a method selected from the group consisting of roll bonding, hot dipping, arc spraying, thermal spraying, low temperature kinetic energy metallization, high velocity low pressure coating, electroplating, physical vapor deposition, chemical vapor deposition and application of a powder metal mixture.

32. The brazing product according to claim 30, wherein the core layer is comprised of aluminum or an aluminum alloy.

33. The brazing product according to claim 32, herein the core layer further comprises one or more alloying elements selected from the group consisting of magnesium, copper, zinc, bismuth, vanadium, iron, zirconium, silver, silicon, nickel, cobalt, lead, titanium and manganese.

34. The brazing product according to claim 32, wherein the one or more alloying elements includes magnesium, the magnesium being present in an amount of up to about 8% by weight of the core layer.

35. The brazing product according to claim 32, wherein the core layer is comprised of an aluminum alloy selected from the group consisting of AA2xxx, AA3xxx, AA5xxx, AA6xxx, AA7xxx and AA8xxx series alloys, and aluminum casting alloys.

36. The brazing product according to claim 30, wherein the core layer has a thickness of up to 5 mm.

37. The brazing product according to claim 36, wherein the thickness of the core layer is from 0.2 to 2 mm.

38. The brazing product according to claim 30, wherein the brazing product comprises a brazing sheet and wherein the core layer comprises an aluminum alloy.

39. The brazing product according to claim 38, wherein the aluminum alloy comprises AA3xxx series aluminum alloy.

40. The brazing product according to claim 38, wherein the brazing sheet further comprises a clad layer between the core layer and the first temperature modifier layer, the clad layer comprising one or more metals selected from the group consisting of aluminum, copper, nickel, silicon, magnesium, antimony, bismuth, lead, thallium, lithium and strontium, and wherein the filler metal further comprises the clad layer.

41. The brazing product according to claim 40, wherein the clad layer comprises an AA4xxx-series aluminum-silicon brazing alloy.

42. The brazing product according to claim 41, herein the first temperature modifier layer comprises a zinc layer applied on top of the clad layer by electroplating, and wherein the braze-promoting layer is comprised of nickel, nickel-lead or nickel-bismuth.

43. The brazing product according to claim 42, further comprising a bonding layer between the core layer and the first temperature modifier layer, the bonding layer comprising zinc, wherein the filler metal further comprises the bonding layer.

44. The brazing product according to claim 43, wherein the bonding layer is applied directly to the clad layer by a zincate pretreatment.

45. The brazing product according to claim 30, wherein the core layer is comprised of a metal selected from the group consisting of titanium, titanium alloys, copper, copper alloys, high strength steel, low carbon steel, stainless steel, nickel, nickel alloy steel, coated titanium, coated stainless steel or coated steel.

46. The brazing product according to claim 45, wherein core layer is comprised of copper or a copper alloy.

47. The brazing product according to claim 46, wherein the core layer is comprised of a copper alloy selected from the group consisting of brass and bronze.

48. The brazing product according to claim 30, further comprising a barrier coating provided between the core layer and the first temperature modifier layer, wherein the filler metal further comprises the barrier coating.

49. The brazing product according to claim 48, wherein the barrier coating comprises nickel, nickel-lead, nickel-bismuth, copper, copper-lead, copper-bismuth, aluminum or silicon.

50. The brazing product according to claim 48, further comprising a bonding layer applied directly on top of the core layer, and wherein the barrier coating is applied between the bonding layer and the first temperature modifier layer, wherein the filler metal further comprises the bonding layer.

51. The brazing product according to claim 1, further comprising a second temperature modifier layer comprised of one or more metals selected from the group consisting of zinc, aluminum, copper, nickel, silicon, magnesium, antimony, bismuth, lead, thallium, lithium, strontium and tin, wherein the filler metal further comprises the second temperature modifier layer.

52. The brazing product according to claim 51, wherein the second temperature modifier layer comprises zinc, zinc-nickel, zinc-antimony, zinc-aluminum, aluminum-zinc, aluminum-zinc-silicon, aluminum-zinc-silicon-magnesium, aluminum-silicon-zinc-copper, aluminum, aluminum-silicon, aluminum-silicon-magnesium aluminum-silicon-copper-magnesium or a copper-based layer comprised of at least 50% by weight copper.

53. The brazing product according to claim 52, wherein the second temperature modifier layer is copper-based and is located either under or on top of the braze-promoting layer.

54. The brazing product according to claim 53, wherein the copper-based layer is comprised of copper or copper-tin.

55. The brazing product according to claim 51, wherein the second temperature modifier layer is applied by a method selected from the group consisting of roll bonding, hot dipping, arc spraying, thermal spraying, low temperature kinetic energy metallization, high velocity low pressure coating, electroplating, physical vapor deposition, chemical vapor deposition and application of a powder metal mixture.

56. A method of manufacturing a brazing product for low temperature, fluxless brazing, the brazing product comprising a filler metal layer, the method comprising:
(a) providing a powder metal composition comprising zinc and nickel; and
(b) forming a filler metal layer comprising the powder metal composition, wherein forming the filler metal layer comprises forming a mixture comprising the powder metal composition and a binder applying the mixture to an aluminum-containing substrate;
wherein heating of the brazing product to a temperature within the range from about 382 to 610° C. results in melting of the filler metal layer, the filler metal layer having a zinc content from about 25 to about 100% by weight.

57. The method according to clam 56, wherein the powder metal composition further comprises one or more elements selected from the group consisting of aluminum and silicon.

58. The method according to claim 56, wherein the powder metal composition further comprises one or more braze modifiers selected from the group consisting of bismuth, lead, antimony, thallium, lithium and strontium.

59. The method according to claim 56, wherein the powder metal composition comprises 96–97% by weight zinc and 3–4% by weight nickel.

60. The method according to claim 56, wherein the powder metal composition comprises 50 to 70% by weight aluminum, 11 to 17% by weight silicon and 13 to 33% by weight nickel.

61. A method of manufacturing an assembly of brazed components, comprising the steps of:
(a) providing said components, at least one of which comprises a brazing product according to claim 1,
(b) forming said components into an assembly;
(c) brazing the assembly in a non-oxidizing environment in the absence of a brazing flux at elevated temperature for a period long enough for melting and spreading of the filler metal; and
(d) cooling the brazed assembly.

62. The method according to claim 61, wherein the non-oxidizing environment is a vacuum or an inert atmosphere.

63. A method of manufacturing an assembly of brazed components, comprising the steps of:
(a) providing said components, at least one of which comprises a brazing product according to claim 30, having a core layer;
(b) forming said components into an assembly;
(c) brazing the assembly in a non-oxidizing environment in the absence of a brazing flux at elevated temperature for a period long enough for melting and spreading of the filler metal; and
(d) cooling the brazed assembly.

64. The method according to claim 63, wherein the non-oxidizing environment is a vacuum or an inert atmosphere.

65. The method according to claim 63, wherein the core layer is comprised of aluminum or an aluminum alloy.

66. The method according to claim 65, wherein the core layer is comprised of an aluminum alloy selected from the group consisting of AA2xxx, AA3xxx, AA5xxx, AA6xxx, AA7xxx and AA8xxx series alloys, and aluminum casting alloys.

67. The method according to claim 66, wherein the first temperature modifier layer comprises a zinc layer applied by electroplating, and wherein the braze-promoting layer is comprised of nickel, nickel-lead or nickel-bismuth.

68. The method according to claim 67, further comprising a bonding layer between the core layer and the first temperature modifier layer, the bonding layer comprising zinc, wherein the filler metal further comprises the bonding layer.

69. A method of manufacturing a brazing product for low temperature, fluxless brazing, the brazing product comprising a filler metal layer, the method comprising:
(a) providing a powder metal composition comprising zinc and nickel; and
(b) forming a filler metal layer comprising the powder metal composition by roll compacting the powder metal composition into surface of an aluminum-containing substrate;
wherein heating of the brazing product to a temperature within the range from about 382 to 610° C. results in melting of the filler metal layer, the filler metal layer having a zinc content from about 25 to about 100% by weight.

70. The method according to claim 69, wherein the powder metal composition further comprises one or more elements selected from the group consisting of aluminum and silicon.

71. The method according to claim 69, wherein the powder metal composition further comprises one or more braze modifiers selected from the group consisting of bismuth, lead, antimony, thallium, lithium and strontium.

72. The method according to claim 69, wherein the powder metal composition comprises 96–97% by weight zinc and 3–4% by weight nickel.

73. The method according to claim 69, wherein the powder metal composition comprises 50 to 70% by weight aluminum, 11 to 17% by weight silicon and 13 to 33% by weight nickel.

* * * * *

UNITED STATES PATENT AND TRADEMARK OFFICE
CERTIFICATE OF CORRECTION

PATENT NO. : 6,913,184 B2
DATED : July 5, 2005
INVENTOR(S) : Kostas F. Dockus et al.

It is certified that error appears in the above-identified patent and that said Letters Patent is hereby corrected as shown below:

Column 24,
Line 14, "61°C" should read -- 610°C --.

Column 25,
Line 33, "according to claim 22" should read -- according to claim 21 --.

Column 26,
Line 4, "herein" should read -- wherein --.

Column 27,
Line 39, "binder applying" should read -- binder and applying --;
Line 46, "clam" should read -- claim --; and
Line 62, "1," should read -- 1; --.

Column 28,
Line 43, "into surface" should read -- into a surface --.

Signed and Sealed this

First Day of November, 2005

JON W. DUDAS
*Director of the United States Patent and Trademark Office*

UNITED STATES PATENT AND TRADEMARK OFFICE
CERTIFICATE OF CORRECTION

PATENT NO. : 6,913,184 B2
DATED : June 5, 2005
INVENTOR(S) : Kostas F. Dockus et al.

It is certified that error appears in the above-identified patent and that said Letters Patent is hereby corrected as shown below:

Title page,
Item [63], Related U.S. Application Data, should read:
-- Continuation-in-part of application No. 09/990,507, filed on November 21, 2001. --.

Signed and Sealed this

Seventh Day of February, 2006

JON W. DUDAS
*Director of the United States Patent and Trademark Office*

UNITED STATES PATENT AND TRADEMARK OFFICE
CERTIFICATE OF CORRECTION

PATENT NO. : 6,913,184 B2  Page 1 of 1
DATED : July 5, 2005
INVENTOR(S) : Kostas F. Dockus et al.

It is certified that error appears in the above-identified patent and that said Letters Patent is hereby corrected as shown below:

<u>Title page,</u>
Item [63], Related U.S. Application Data, should read:
-- Continuation-in-part of application No. 09/990,507, filed on November 21, 2001. --.

This certificate supersedes Certificate of Correction issued February 7, 2006.

Signed and Sealed this

Twenty-first Day of March, 2006

JON W. DUDAS
*Director of the United States Patent and Trademark Office*